(12) United States Patent
Hong

(10) Patent No.: US 7,714,050 B2
(45) Date of Patent: May 11, 2010

(54) RUBBER COMPOSITIONS AND METHODS FOR DECREASING THE TANGENT DELTA VALUE AND MAINTAINING THE ABRASION RESISTANCE INDEX

(75) Inventor: Sung Whee Hong, Cheshire, CT (US)

(73) Assignee: Crompton Corporation, Middlebury, CT (US)

(*) Notice: Subject to any disclaimer, the term of this patent is extended or adjusted under 35 U.S.C. 154(b) by 464 days.

(21) Appl. No.: 10/964,855

(22) Filed: Oct. 13, 2004

(65) Prior Publication Data

US 2005/0085583 A1  Apr. 21, 2005

(51) Int. Cl.
*C08C 19/08* (2006.01)
*B29C 47/00* (2006.01)

(52) U.S. Cl. .............. 524/201; 524/232; 524/236; 524/285; 524/287

(58) Field of Classification Search .......... 524/86, 524/95, 98, 99, 201, 232, 236, 285, 287, 524/251

See application file for complete search history.

(56) References Cited

U.S. PATENT DOCUMENTS

| | | | |
|---|---|---|---|
| 4,714,734 A | 12/1987 | Hashimoto et al. | |
| 5,703,151 A | 12/1997 | Yamamoto et al. | |
| 5,905,107 A | 5/1999 | Well | |
| 6,140,393 A | 10/2000 | Bomal et al. | |
| 6,191,247 B1 | 2/2001 | Ishikawa et al. | |
| 6,255,446 B1* | 7/2001 | Nakamura et al. | 528/393 |
| 6,362,253 B1 | 3/2002 | Durel | |
| 6,414,061 B1* | 7/2002 | Cruse et al. | 524/262 |
| 6,593,433 B2 | 7/2003 | Agostini | |
| 6,620,875 B2 | 9/2003 | Hong et al. | |
| 2005/0176858 A1* | 8/2005 | Nohara et al. | 524/106 |

FOREIGN PATENT DOCUMENTS

| | | |
|---|---|---|
| EP | 0 479 526 A1 | 4/1992 |
| GB | 808302 | 2/1959 |
| WO | 97/14748 | 4/1997 |
| WO | 03/020813 | 3/2003 |

OTHER PUBLICATIONS

"Notification of Transmittal of the International Preliminary Report on Patentability"; PCT/US2004/034415; mailed Jan. 9, 2006; 8 pages.
"Written Opinion of the International Searching Authority"; PCT/US2004/034415; mailed Dec. 11, 2002; 7 pages.
"International Search Report"; PCT/US2004/034415; mailed Jan. 9, 2006; 3 pages.
Terakawa, Katsumi et al.; "Application of Epoxidized NR/Diamine Vulcanizates for Tyre Tread"; 1998, Kautshuk Gummi Kunststoffee; 51(5); 326-330 CODEN: KGUKAC; ISSN: 0022-9520; XP000766426 tables 1, 2 paragraph FIG 3.
Yanagisawa, Kazuhiro; "Use of Tertiary Alkylamine—Fatty Acid Salt to Improve Rolling Resistance and Processability on Silica Tread"; 2002; Technical Papers—American Chemical Society, rubber Division, Fall Technical Program, 162nd, Pittsburgh, PA, United States, Oct. 8-11, 2002, 1212-1227; Publisher: American Chemical Society, Rubber Division, Akron, Ohio, CODEN:69DXQZ; XP008042028; p. 1; Paragraph 1; p. 9; Table IV.

* cited by examiner

*Primary Examiner*—Peter D Mulcahy
(74) *Attorney, Agent, or Firm*—JoAnn Villamizar

(57) ABSTRACT

A rubber composition is disclosed wherein the rubber composition contains at least (a) a rubber component; (b) a silica filler; (c) a coupling agent; (d) an effective amount of a nitrogen-containing compound; and, (e) a thiuram disulfide having a molecular weight of at least about 400.

15 Claims, No Drawings

RUBBER COMPOSITIONS AND METHODS FOR DECREASING THE TANGENT DELTA VALUE AND MAINTAINING THE ABRASION RESISTANCE INDEX

BACKGROUND OF THE INVENTION

1. Technical Field

The present invention relates generally to rubber compositions and methods for decreasing the tangent delta value (i.e., hysteresis) and maintaining the abrasion resistance index (i.e., wear resistance). The rubber compositions are particularly useful for tire tread applications in vehicles, e.g., trucks.

2. Description of the Related Art

The tire treads of modern tires must meet performance standards which require a broad range of desirable properties. Generally, three types of performance standards are important in tread compounds. They include good wear resistance, good traction and low rolling resistance. Major tire manufacturers have developed tire tread compounds which provide lower rolling resistance for improved fuel economy and better skid/traction for a safer ride. Thus, rubber compositions suitable for, e.g., tire treads, should exhibit not only desirable strength and elongation, particularly at high temperatures, but also good cracking resistance, good abrasion resistance, desirable skid resistance, low tangent delta values at 60° C. and low frequencies for desirable rolling resistance of the resulting treads. Additionally, a high complex dynamic modulus is necessary for maneuverability and steering control. A long mooney scorch value is further needed for processing safety.

Presently, silica has been added to rubber compositions as a filler to replace some or substantially all of the carbon black filler to improve these properties, e.g., lower rolling resistance. Although more costly than carbon black, the advantages of silica include, for example, improved wet traction, low rolling resistance, etc., with reduced fuel consumption. Indeed, as compared to carbon black, there tends to be a lack of, or at least an insufficient degree of, physical and/or chemical bonding between the silica particles and the rubber to enable the silica to become a reinforcing filler for the rubber thereby giving less strength to the rubber. Therefore, a silica filler system requires the use of coupling agents.

Coupling agents are typically used to enhance the rubber reinforcement characteristics of silica by reacting with both the silica surface and the rubber elastomer molecule. Such coupling agents, for example, may be premixed or pre-reacted with the silica particles or added to the rubber mix during the rubber/silica processing, or mixing, stage. If the coupling agent and silica are added separately to the rubber mix during the rubber/silica processing, or mixing, stage, it is considered that the coupling agent then combines in situ with the silica.

A coupling agent is a bi-functional molecule that will react with the silica at one end thereof and cross-link with the rubber at the other end. In this manner, the reinforcement and strength of the rubber, e.g., the toughness, strength, modulus, tensile and abrasion resistance, are particularly improved. The coupling agent is believed to cover the surface of the silica particle which then hinders the silica from agglomerating with other silica particles. By interfering with the agglomeration process, the dispersion is improved and therefore the wear and fuel consumption are improved.

The use of silica in relatively large proportions for improving various tire properties requires the presence of a sufficient amount of a coupling agent. The silica however retards the cure. Therefore, a silica/coupling agent tread formulation has been found to undesirably slow the cure rate of the rubber. Additionally, by employing high amounts of the coupling agents results in the rubber compositions being more costly since these materials are expensive.

In order to increase the cure rate, secondary accelerators such as, for example, diphenyl guanidine (DPG), have been added to the rubber compositions. However, the use of secondary accelerators, and particularly DPG, result in the rubber compositions having a shorter mooney scorch value during its manufacture thereby resulting in decreased processing time. Problems associated with a decreased processing time include, for example, precured compounds and rough surfaces on extruded parts. Additionally, diphenyl guanidine is typically employed in high amounts which result in the rubber compositions being more expensive to manufacture since more material must be used.

It would therefore be desirable to provide a rubber composition having a decreased cure time and longer mooney scorch value for processing while also a decreased tangent delta value. This will allow for better processing of the rubber composition during its manufacture and an improved resulting tire product.

SUMMARY OF THE INVENTION

In accordance with one embodiment of the present invention, a rubber composition is provided comprising (a) a rubber component; (b) a silica filler; (c) a coupling agent; (d) an effective amount of a nitrogen-containing compound; and, (e) a thiuram disulfide having a molecular weight of at least about 400.

In another embodiment of the present invention, a rubber composition is provided comprising (a) a rubber component; (b) a silica filler; (c) a coupling agent; (d) an effective amount of a nitrogen-containing compound, a polyalkylene oxide and an organic acid; and, (e) a thiuram disulfide having a molecular weight of at least about 400.

In yet another embodiment of the present invention, a method for decreasing the tangent delta value of a rubber composition is provided comprising the step of forming a rubber composition comprising (a) a rubber component; (b) a silica filler; (c) a coupling agent; (d) an effective amount of a nitrogen-containing compound; and, (e) a thiuram disulfide having a molecular weight of at least about 400.

By employing an effective amount of a nitrogen-containing compound in the rubber compositions herein, a decreased tangent delta value of the rubber compositions can advantageously be achieved. Moreover, by further employing a high molecular weight thiuram disulfide, i.e., a thiuram disulfide having a weight average molecular weight ($M_w$) of at least 400, with the nitrogen-containing compounds, the mooney scorch value of the rubber compositions are increased thereby allowing for better processing of the compositions without sacrificing other physical properties.

In addition, the utilization of an effective amount of a polyalkylene oxide in the rubber compositions of the present invention advantageously allows for the use of lesser amounts of a coupling agent in forming the rubber compositions resulting in the compositions disclosed herein possessing a higher cure rate. Accordingly, the delay in cure/vulcanization of rubber observed with the use of silica and coupling agent alone as noted above has been lessened, if not substantively overcome, in many cases by the effective amount of the polyalkylene oxides of the present invention. Thus, the polyalkylene oxides herein have been found to increase the cure rate and, in some instances, to fully recapture any cure slow down presumed to have resulted from the use of the silica with higher amounts of a coupling agent relative to the present invention which employs lower amounts of a coupling agent with a polyalkylene oxide. In this manner, the polyalkylene oxides have enabled achievement of the silica benefits in full without the prior art disadvantage while also achieving a greater economical advantage by using less materials of the more expensive coupling agent.

The term "phr" is used herein as its art-recognized sense, i.e., as referring to parts of a respective material per one hundred (100) parts by weight of rubber.

DESCRIPTION OF THE PREFERRED EMBODIMENTS

The rubber compositions of this invention contain at least (a) a rubber component; (b) a silica filler; (c) a coupling agent; (d) an effective amount of a nitrogen-containing compound; and, (e) a thiuram disulfide having a molecular weight of at least about 400.

The rubber components for use herein are based on at least highly unsaturated rubbers such as, for example, natural or synthetic rubbers. Preferably, natural rubbers are used when forming truck tires. Representative of the highly unsaturated polymers that can be employed in the practice of this invention are diene rubbers. Such rubbers will ordinarily possess an iodine number of between about 20 to about 450, although highly unsaturated rubbers having a higher or a lower (e.g., of 50-100) iodine number can also be employed. Illustrative of the diene rubbers that can be utilized are polymers based on conjugated dienes such as, for example, 1,3-butadiene; 2-methyl-1,3-butadiene; 1,3-pentadiene; 2,3-dimethyl-1,3-butadiene; and the like, as well as copolymers of such conjugated dienes with monomers such as, for example, styrene, alpha-methylstyrene, acetylene, e.g., vinyl acetylene, acrylonitrile, methacrylonitrile, methyl acrylate, ethyl acrylate, methyl methacrylate, ethyl methacrylate, vinyl acetate, and the like. Preferred highly unsaturated rubbers include natural rubber, cis-polyisoprene, polybutadiene, poly(styrene-butadiene), styrene-isoprene copolymers, isoprene-butadiene copolymers, styrene-isoprene-butadiene tripolymers, polychloroprene, chloro-isobutene-isoprene, nitrile-chloroprene, styrene-chloroprene, and poly (acrylonitrile-butadiene). Moreover, mixtures of two or more highly unsaturated rubbers with elastomers having lesser unsaturation such as EPDM, EPR, butyl or halogenated butyl rubbers are also within the contemplation of the invention.

The silica may be of any type that is known to be useful in connection with the reinforcing of rubber compositions. Examples of suitable silica fillers include, but are not limited to, silica, precipitated silica, amorphous silica, vitreous silica, fumed silica, fused silica, synthetic silicates such as aluminum silicates, alkaline earth metal silicates such as magnesium silicate and calcium silicate, natural silicates such as kaolin and other naturally occurring silicas and the like. Also useful are highly dispersed silicas having, e.g., BET surfaces of from about 5 to about 1000 $m^2/g$ and preferably from about 20 to about 400 $m^2/g$ and primary particle diameters of from about 5 to about 500 nm and preferably from about 10 to about 400 nm. These highly dispersed silicas can be prepared by, for example, precipitation of solutions of silicates or by flame hydrolysis of silicon halides. The silicas can also be present in the form of mixed oxides with other metal oxides such as, for example, Al, Mg, Ca, Ba, Zn, Zr, Ti oxides and the like. Commercially available silica fillers known to one skilled in the art include, e.g., those available from such sources as Cabot Corporation under the Cab-O-Sil® tradename; PPG Industries under the Hi-Sil and Ceptane tradenames; Rhodia under the Zeosil tradename and Degussa AG under the Ultrasil and Coupsil tradenames. Mixtures of two or more silica fillers can be used in preparing the rubber composition of this invention. A preferred silica for use herein is Zeosil 1165 MP manufactured by Rhodia.

The silica filler is incorporated into the rubber composition in amounts that vary widely. Generally, the amount of silica filler can range from about 5 to about 150 phr, preferably from about 10 to about 100 phr and more preferably from about 15 to about 90 phr.

If desired, carbon black fillers can be employed with the silica filler in forming the rubber compositions of this invention. Suitable carbon black fillers include any of the commonly available, commercially-produced carbon blacks known to one skilled in the art. Generally, those having a surface area (EMSA) of at least 20 $m^2/g$ and more preferably at least 35 $m^2/g$ up to 200 $m^2/g$ or higher are preferred. Surface area values used in this application are those determined by ASTM test D-3765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the rubber compositions of the invention. Typical values for surface areas of usable carbon blacks are summarized in the following Table I.

TABLE I

| Carbon Blacks | |
|---|---|
| ASTM Designation (D-1765-82a) | Surface Area ($m^2/g$) (D-3765) |
| N-110 | 126 |
| N-234 | 120 |
| N-220 | 111 |
| N-339 | 95 |
| N-330 | 83 |
| N-550 | 42 |
| N-660 | 35 |

The carbon blacks utilized in the invention may be in pelletized form or an unpelletized flocculent mass. Preferably, for ease of handling, pelletized carbon black is preferred. The carbon blacks, if any, are ordinarily incorporated into the rubber composition in amounts ranging from about 1 to about 80 phr and preferably from about 5 to about 60 phr.

In compounding a silica filled rubber composition of the present invention, it is particularly advantageous to employ a coupling agent. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, e.g., a sulfur vulcanizable rubber which contains carbon-to-carbon double bonds, or unsaturation. In this manner, then, the coupling agent acts as a connecting bridge between the silica and the rubber thereby enhancing the rubber reinforcement aspect of the silica.

The silane component of the coupling agent is believed to form a bond to the silica surface, possibly through hydrolysis, and the rubber reactive component of the coupling agent combines with the rubber itself. Generally, the rubber reactive component of the coupling agent is temperature sensitive and tends to combine with the rubber during the final and higher temperature sulfur vulcanization stage, i.e., subsequent to the rubber/silica/coupling mixing stage and after the silane group of the coupling agent has combined with the silica. However, partly because of typical temperature sensitivity of the coupling agent, some degree of combination, or bonding, may occur between the rubber-reactive component of the coupling agent and the rubber during an initial rubber/silica/coupling agent mixing stage and prior to a subsequent vulcanization stage.

Suitable rubber-reactive group components of the coupling agent include, but are not limited to, one or more of groups such as mercapto, amino, vinyl, epoxy, and sulfur groups. Preferably the rubber-reactive group components of the coupling agent is a sulfur or mercapto moiety with a sulfur group being most preferable.

Examples of a coupling agent for use herein are vinyl-trichlorosilane, vinyltrimethoxysilane, vinyltriethoxysilane, vinyltris(-methoxyethoxy) silane, -(3,4-epoxycyclohexyl) ethyltrimethoxysilane, -glycidoxypropyltrimethoxysilane, -glycidoxypropylmethyldiethoxysilane, -glycidoxypropyltriethoxysilane, -methacryloxypropylmethyldimethoxysilane, -methacryloxypropyltrimethoxysilane, -methacryloxypropylmethyldiethoxysilane, -methacryloxypropyltriethoxysilane, -(aminoethyl)-aminopropylmethyldimethoxysilane, N-(aminoethyl)-aminopropyltrimethoxysilane, N-(aminoethyl)-aminopropyltriethoxysilane, -aminopropyltrimethoxysilane, -aminopropyltriethoxysilane, -phenyl-aminopropyltrimethoxysilane, -chloropropyltrimethoxysilane, -mercaptopropyltrimethoxysilane and combinations thereof.

Representative examples of the preferred sulfur-containing coupling agents are sulfur-containing organosilicon compounds. Specific examples of suitable sulfur-containing organosilicon compounds are of the following general formula:

in which Z is selected from the group consisting of

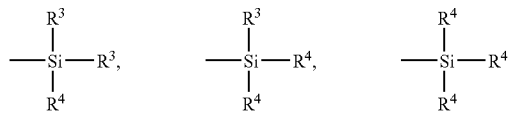

wherein $R^3$ is an alkyl group of from 1 to 4 carbon atoms, cyclohexyl or phenyl; and $R^4$ is an alkoxy of from 1 to 8 carbon atoms, or cycloalkoxy of 5 to 8 carbon atoms; and $R^1$ and $R^2$ are independently a divalent hydrocarbon of from 1 to 18 carbon atoms and n is an integer of from about 2 to about 8.

Specific examples of sulfur-containing organosilicon compounds which may be used herein include, but are not limited to, 3,3'-bis(trimethoxysilylpropyl) disulfide, 3,3'-bis(triethoxysilylpropyl) disulfide, 3,3-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) triasulfide, 3,3'-bis(triethoxysilylpropyl) triasulfide, 3,3'-bis(tributoxysilylpropyl) disulfide, 3,3'-bis(trimethoxysilylpropyl) hexasufide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilyipropyl) tetrasulfide, 3,3'-bis(tri-t-butoxysilyl-propyl) disulfide, 2,2'-bis(methoxydiethoxysilylethyl) tetrasulfide, 2,2'-bis(tripropoxysilylethyl) pentasulfide, 3,3'-bis(tricyclohexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methylbutylethoxysilylpropyl) tetrasulfide, 3,3'-bis(di t-butylmethoxysilylpropyl) tetrasulfide, 2,2'-bis(phenylmethylmethoxysilylethyl) trisulfide, 3,3'-bis(diphenylisopropoxysilylpropyl) tetrasulfide, 3,3'-bis(diphenyl cyclohexoxysilylpropyl) disulfide, 3,3'-bis(dimethylethylmercaptosilylpropyl) tetrasulfide, 2,2'-bis(methyldimethoxysilylethyl) trisulfide, 2,2'-bis(methyl ethoxypropoxysilylethyl) tetrasulfide, 3,3'-bis(diethylmethoxysilylpropyl) tetrasulfide, 3,3'-bis(ethyl di-sec. butoxysilylpropyl) disulfide, 3,3'-bis(propyldiethoxysilylpropyl) disulfide, 3,3'-bis(butyl dimethoxysilylpropyl) trisulfide, 3,3'-bis(phenyl dimethoxysilylpropyl) tetrasulfide, 3-phenylethoxybutoxysilyl 3'-trimethoxysilyipropyl tetrasulfide, 4,4'-bis(trimethoxysilylbutyl) tetrasulfide, 6,6'-bis(triethoxysilylhexyl) tetrasulfide, 12,12'-bis(triisopropoxysilyldodecyl) disulfide, 18,18'-bis(trimethoxysilyloctadecyl) tetrasulfide, 18,18'-bis(tripropoxysilyl-octadecenyl) tetrasulfide, 4,4'-bis(trimethoxysilyl-butene-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide and the like. Preferred coupling agents for use herein are 3,3'-bis(triethoxysilylpropyl) disulfide and 3,3'-bis(triethoxysilylpropyl) tetrasulfide.

The nitrogen-containing compounds used herein advantageously decrease the tangent delta value of the rubber compositions of the present invention. Suitable nitrogen-containing compounds for use herein include, but are not limited to, carboxylic acid amides, hydrocarbyl monoamines, hydrocarbyl polyamines, hydroxy substituted hydrocarbyl monoamines, hydroxy substituted hydrocarbyl polyamines, Mannich bases, phosphonoamides, thiophosphonamides and phosphoramides and the like and mixtures thereof.

Suitable carboxylic acid amides for use herein are ordinarily prepared by reacting a carboxylic acid or anhydride or ester thereof, having at least 12 to about 350 aliphatic carbon atoms in the principal aliphatic chain with a hydrocarbyl amine, e.g., ethylene amine, or a hydrocarbyl polyamine to give a mono or polycarboxylic acid amide. Example of useful carboxylic acid amides are those disclosed in U.S. Pat. No. 3,405,064, the contents of which are incorporated by reference herein. Preferred are those amides prepared from (1) a carboxylic acid of the formula $R^9COOH$, where $R^9$ is $C_{12-20}$ alkyl or a mixture of this acid with a polyalkenyl carboxylic acid in which the polyalkenyl group contains from, e.g., 72 to 128 carbon atoms and (2) an alkyl amine, such as dibutyl amine or an alkylene amine such as ethylene amine, or an alkylene polyamine such as triethylene tetramine or tetraethylene pentamine and the like and mixtures thereof.

Another class of useful nitrogen-containing compounds are hydrocarbyl monoamines and hydrocarbyl polyamines. Examples of such nitrogen-containing compounds are those disclosed in U.S. Pat. No. 3,574,576, the contents of which are incorporated by reference herein. The hydrocarbyl group can be, for example, a $C_1$-$C_{50}$, preferably, $C_2$-$C_{20}$, most preferably, $C_3$-$C_{12}$, alkyl group, or an olefinic group having one or two sites of unsaturation and containing from 1 to 350 and preferably from 6 to about 200 carbon atoms. Particularly preferred are hydrocarbyl monoamines such as, for example, dialkyl amines such as dibutyl amine and alkyl amines such as isopropyl amine. Also useful are hydroxy substituted hydrocarbyl monoamines and hydroxy substituted hydrocarbyl polyamines containing from two to about 50 carbon atoms and from one to six hydroxyl groups. Examples include di isopropanol amine, ethanol amine, and the like and mixtures thereof.

Yet another class of useful nitrogen-containing compounds are the Mannich base compounds. These compounds are prepared from a phenol or $C_{9-200}$ alkylphenol, an aldehyde, such as formaldehyde or a formaldehyde precursor such as paraformaldehyde, and an amine compound. The amine may be a monoamine such as an alkylamine, e.g., methylamine, or an alkylene amine, e.g., ethylene amine, or a polyamine such as, for example, diethylene triamine, or tetraethylene pentamine, and the like. The phenolic material may be sulfurized and preferably is dodecylphenol or a $C_{80-100}$ alkylphenol. Typical Mannich bases which can be used in this invention are disclosed in U.S. Pat. Nos. 3,539,663, 3,649,229; 3,368,972 and 4,157,309, the contents of which are incorporated by reference herein. U.S. Pat. No. 3,539,663 discloses Mannich bases prepared by reacting an alkylphenol having at least 50 carbon atoms, preferably 50 to 200 carbon atoms with formaldehyde and an alkylene polyamine HN(ANH)$_n$H where A is a saturated divalent alkyl hydrocarbon of 2 to 6 carbon atoms and n is 1-10 and where the condensation product of said alkylene polyamine may be further reacted with urea or thiourea.

Still yet another class of useful nitrogen-containing compounds are the phosphoramides and phosphonamides, e.g., those disclosed in U.S. Pat. Nos. 3,909,430 and 3,968,157, the contents of which are incorporated by reference herein. These compounds may be prepared by forming a phosphorus compound having at least one P—N bond. They can be prepared, for example, by reacting phosphorus oxychloride with a hydrocarbyl diol in the presence of a monoamine or by reacting phosphorus oxychloride with a difunctional secondary amine and a mono-functional amine. Thiophosphoramides can be prepared by reacting an unsaturated hydrocarbon compound containing from 2 to 450 or more carbon atoms, such as polyethylene, polyisobutylene, polypropylene, ethylene, 1-hexene, 1,3-hexadiene, isobutylene, 4-methyl-1-pentene, and the like, with phosphorus pentasulfide and a nitrogen-containing compound as defined above, particularly an alkylamine, alkyldiamine, alkylpolyamine, or an alkyleneamine, such as ethylene diamine, diethylenetriamine, triethylenetetramine, tetraethylenepentamine, and the like.

Still yet another class of useful nitrogen-containing compounds are the cyclic amines. Examples of such compounds include pyrrolidine, piperidine, piperazine, morpholine and the like. Also useful are alkyl groups substitiuted with one or more of the foregoing cyclic amines. Examples of such amines include 2-(2-aminoethyl)-1-methylpyrrolidine, 4-(2-aminoethyl)-morpholine, 1-(2-aminoethyl)pyrrolidine, 1-(2-aminoethyl)piperidine, 1-(2-aminoethyl)piperazine, and the like. Another useful class includes (aminoalkyl)alkylamines such as, for example, N-alkylethylene diamines, N-alkyl-1, 3-propane diamines, and the like.

Generally, the nitrogen-containing compounds are added to the rubber compositions of the present invention in an amount effective to decrease the tangent delta value. However, the use of nitrogen-containing compounds may reduce scorch safety. Accordingly, amounts of such nitrogen-containing compounds can vary widely according to the specific components used in the rubber compositions herein. Amounts of the nitrogen-containing will ordinarily range from about 0.05 to about 2.0 phr, preferably from about 0.1 to about 1.5 phr and more preferably from about 0.15 to about 1.0 phr.

The polyalkylene oxides used herein advantageously decrease the cure time of the rubber compositions of this invention when added thereto in an effective amount. Suitable polyalkylene oxides for use herein can be a polyalkylene oxide which is a polyether of the general formula X(R—O—)$_n$H where R may be one or more of the following groups: methylene, ethylene, propylene or tetramethylene group; n is an integer of from 1 to about 50, preferably from about 2 to about 30 and most preferably from about 4 to about 20; and X is a non-aromatic starter molecule containing 1 to about 12 and preferably 2 to 6 functional groups. Representative of the polyalkylene oxides include, but are not limited to, dimethylene glycol, diethylene glycol, dipropylene glycol, trimethylene glycol, triethylene glycol, tripropylene glycol, polyethylene oxide, polypropylene oxide, polybutylene oxide and the like and mixtures thereof. Preferred polyalkylene oxides for use herein are diethylene glycol and polyethylene oxide.

By employing the foregoing polyalkylene oxides herein in an effective amount, the amount of coupling agent necessary to compound a silica filled rubber composition is reduced thereby providing an economical advantage. Accordingly, amounts of the coupling agent range from about 0.5 to about 15 phr, preferably from about 0.75 to about 12 phr and most preferably from about 1.0 to about 10 phr while the effective amount of the polyalkylene oxide will ordinarily range from about 0.2 to about 10 phr, preferably from about 0.3 to about 8 phr and most preferably from about 0.5 to about 5 phr.

The foregoing polyalkylene oxides can be, for example, premixed, or blended, with the coupling agents or added to the rubber mix during the rubber/silica/coupling agent processing, or mixing, stage. Alternatively, the foregoing polyalkylene oxides can be, for example, premixed, or blended, with the nitrogen-containing compounds and organic acids (as discussed below).

The high molecular weight thiuram disulfides for use in the rubber composition of this invention as a secondary accelerator advantageously provide a rubber composition possessing a greater mooney scorch value and equivalent cure rate than that of a similar rubber composition with a higher of diphenyl guanidine as a secondary accelerator. The thiuram disulfides herein will have a weight average molecular weight of at least 400, preferably from about 500 to about 1250 and most preferably from about 800 to about 1000.

Representative of these thiuram disulfides are those of the general formula

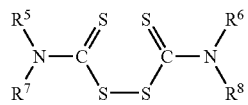

wherein $R^5$, $R^6$, $R^7$ and $R^8$ each are the same or different and are hydrocarbons containing, for example, from about 4 to about 30 carbon atoms, optionally containing one or more heterocyclic: groups, or $R^5$ and $R^6$ and/or $R^7$ and $R^8$ together with the nitrogen atom to which they are bonded are joined together to form a heterocyclic group, optionally containing one or more additional heterocyclic atoms. Specific thiuram disulfides include those in which $R^5$, $R^6$, $R^7$ and $R^8$ are independently selected to be t-butyl, pentyl, hexyl, cyclohexyl, heptyl, octyl, 2-ethylhexyl, nonyl, decyl, undecyl, dodecyl, stearyl, oleyl, phenyl, benzyl, tridecyl, tetradecyl, pentadecyl, hexadecyl, heptadecyl, octadecyl, nonadecyl, eicosanyl, and the like. It is particularly advantageous to employ a thiuram disulfide wherein $R^5$, $R^6$, $R^7$ and $R^8$ each possess between 8 to 18 carbon atoms. A particularly preferred thiuram disulfide for use herein is wherein $R^5$, $R^6$, $R^7$ and $R^8$ each possess between 12 and 14 carbon atoms.

Generally, the thiuram disulfide is present in the rubber composition of this invention in an amount ranging from about 0.10 to about 1.0 phr, preferably from about 0.15 to about 0.75 phr and most preferably from about 0.20 to about 0.70 phr.

As previously noted, the use of the nitrogen-containing compounds may reduce scorch safety resulting in scorch problems. As such, it may be necessary to add an organic acid to increase scorch safety for improved processing of the rubber compositions of the present invention. Useful organic acid include, but are not limited to, a branched, straight chain, or cyclic alkanoic, alkenoic, or alkynoic acid; or an aryl, alkyl or aryl organic acid having one or more carboxylic acids groups; or a mixture of such acids. Examples of suitable organic acids include, but are not limited to, aliphatic carboxylic acids of 2 to about 20 carbon atoms, and aromatic and cycloaliphatic carboxylic acids of 6 to about 24 carbon atoms, per molecule. The suitable acids will generally contain at least 1 to 3 carboxyl groups. For example, suitable aliphatic acids include, but are not limited to, acetic acid, butyric acid, lauric acid, palmitic acid, neo-pentanoic acid, propanoic acid, chloroacetic acid, dichloroacetic acid, succinic acid, adipic acid, sebacic acid, acrylic acid, methacrylic acid, succinic acid, and mixtures of two or more thereof. Suitable aromatic acids include, but are not limited to, benzoic acid, m-nitrobenzoic acid, isophthalic acid, phthalic, phenylacetic acid, p-chlorobenzoic acid, trans-cinnamic acid, m-toluic acid, terephthalic acid, and mixtures of two or more thereof. Suitable cycloaliphatic acids include, but is not limited to, cyclopentane carboxylic acid, cyclohexane carboxylic acid, cycloheptane carboxylic acids and the like and mixtures thereof.

Generally, the organic acid is present in the rubber composition of this invention in an amount effective to increase scorch safety. Amounts of such organic acids will ordinarily range from about 0.1 to about 5 phr, preferably from about 0.15 to about 4 phr and most preferably from about 0.2 to about 3 phr.

The rubber compositions of the invention may further comprise, if necessary, reinforcing or non-reinforcing fillers other than carbon black or silica. Examples of the fillers include powders or fibers of inorganic compounds such as powdered quartz, ground whiting, light calcium carbonate, whiting, chalk, magnesium-containing specific calcium carbonate, surface treated calcium carbonate, magnesium carbonate, magnesite, kaoline groups, kaolinite, nacrite, hallocite, hydrous halloycite, allophane, pyrophylite, talc, montmorillonite, beidellite, hectorite, saponite, nontronite, sericite, illite, muscovite, phlogopite, biotite, amesite, chamosite, hard clay, soft clay, kaolin clay, calcined clay, diatomaceous earth, gibbsite, beyerite, boehmite, diaspore, gamma-alumina, alpha-alumina, barium carbonate, strontium carbonate, bentonite, zinc oxide, zinc carbonate, activated clay, aluminium hydroxide, titanium oxide, ferrite, asbestos, glass powder, aluminium silicate, red iron oxide, hydrotalcite, magnesium hydroxide, activated zinc powder, silicon carbide, silicon nitride, zirconium titanate, zironium oxide, and the like; and organic compounds such as phenolic resins, coumarone resins, styrene resin, high styrene-containing styrene-butadiene resins, nylons, aramid resins, and the like.

The rubber compositions of this invention can be formulated in any conventional manner. Additionally, at least one other common additive can be added to the rubber compositions of this invention, if desired or necessary, in a suitable amount. Suitable common additives for use herein include vulcanizing agents, activators, retarders, antioxidants, plasticizing oils and softeners, reinforcing fillers, reinforcing pigments, antiozonants, waxes, tackifier resins, and the like and combinations thereof.

The rubber compositions of this invention are particularly useful when manufactured into articles such as, for example, tires, motor mounts, rubber bushings, power belts, printing rolls, rubber shoe heels and soles, rubber floor tiles, caster wheels, elastomer seals and gaskets, conveyor belt covers, hard rubber battery cases, automobile floor mats, mud flap for trucks, ball mill liners, windshield wiper blades and the like. Preferably, the rubber compositions of this invention are advantageously used in a tire as a component of any or all of the thermosetting rubber-containing portions of the tire. These include the tread, sidewall, and carcass portions intended for, but not exclusive to, a truck tire, passenger tire, off-road vehicle tire, vehicle tire, high speed tire, and motorcycle tire that also contain many different reinforcing layers therein. Such rubber or tire tread compositions in accordance with the invention may be used for the manufacture of tires or for the re-capping of worn tires. It is particularly preferred that the rubber compositions of the present invention are used in a truck tire.

The following non-limiting examples are illustrative of the present invention.

COMPARATIVE EXAMPLES A-D AND EXAMPLES 1-2

Employing the ingredients indicated in Tables II, III and IV (which are listed in parts per hundred of rubber by weight), several rubber compositions were compounded in the following manner: the ingredients indicated in Table II were added to an internal mixer and mixed until the materials are incorporated and thoroughly dispersed and discharged from the mixer. Discharge temperatures of about 160° C. are typical. The batch is cooled, and is reintroduced into the mixer along with the ingredients indicated in Table III. The second pass is shorter and discharge temperatures generally run at about 150° C. The batch is cooled, and is reintroduced into the mixer along with the ingredients indicated in Table IV. The third pass is shorter with curatives and discharge temperatures generally run at about 100° C.

TABLE II

| | PHASE I | | | | | |
|---|---|---|---|---|---|---|
| Comp. Ex./Ex. | A | B | C | D | 1 | 2 |
| SIR-20[1] | 100.00 | 100.00 | 100.00 | 100.00 | 100.00 | 100.00 |
| N-220 BLACK[2] | 59.00 | 5.00 | 5.00 | 5.00 | 5.00 | 5.00 |
| ZEOSIL 1165[3] | 0.00 | 60.00 | 60.00 | 60.00 | 60.00 | 60.00 |
| SUNDEX 790[4] | 7.00 | 7.00 | 7.00 | 7.00 | 7.00 | 7.00 |
| SILQUEST A-1289[5] | 0.00 | 4.80 | 3.60 | 3.60 | 3.60 | 3.60 |

TABLE II-continued

PHASE I

| Comp. Ex./Ex. | A | B | C | D | 1 | 2 |
|---|---|---|---|---|---|---|
| KETTLITZ AKTIOL[6] | 0.00 | 0.00 | 1.50 | 2.50 | 0.00 | 0.00 |
| KETTLITZ-ACTIVIN[7] | 0.00 | 0.00 | 0.00 | 0.00 | 1.50 | 2.50 |
| MB-1: TOTAL | 166.00 | 176.80 | 177.10 | 178.10 | 177.10 | 178.10 |

[1] Standard Indonesian Natural Rubber. (SIR-20)
[2] High surface area carbon black available from Cabot Corp.
[3] Highly disperable silica available from Rhodia.
[4] Aromatic oil available from Sun Oil.
[5] Tetrasulfide silane coupling agent available from OSI Specialty Chemicals.
[6] Blends of polyethylene glycol with silica available from Kettlitz-Chemie GmbH & Co. (Rennertshofen. Germany).
[7] Blends of polyethylene glycol, dibutyl amine and benzoic acid with silica available from Kettlitz-Chemie GmbH & Co. (Rennertshofen. Germany).

TABLE III

PHASE II

| Comp. Ex./Ex. | A | B | C | D | 1 | 2 |
|---|---|---|---|---|---|---|
| MB-1[8] | 166.00 | 176.80 | 177.10 | 178.10 | 177.10 | 178.10 |
| KADOX 911C[9] | 3.00 | 3.00 | 3.00 | 3.00 | 3.00 | 3.00 |
| FLEXZONE 7P[10] | 2.00 | 2.00 | 2.00 | 2.00 | 2.00 | 2.00 |
| STEARIC ACID | 2.00 | 2.00 | 2.00 | 2.00 | 2.00 | 2.00 |
| SUNPROOF IMP. WAX[11] | 1.50 | 1.50 | 1.50 | 1.50 | 1.50 | 1.50 |
| MB-2: TOTAL | 174.50 | 185.30 | 185.60 | 186.60 | 185.60 | 186.60 |

[8] MB-1 is the batch provided as set forth in Table II.
[9] Zinc oxide available from Zinc Corp of America.
[10] Paraphenylene diamine available from Uniroyal Chemical Company.
[11] Blend of hydrocarbon waxes available from Uniroyal Cheimical Company.

TABLE IV

PHASE III

| Comp. Ex./Ex. | A | B | C | D | 1 | 2 |
|---|---|---|---|---|---|---|
| MB-2[12] | 174.50 | 185.30 | 185.60 | 186.60 | 185.60 | 186.60 |
| DELAC NS[13] | 1.00 | 1.00 | 1.00 | 1.00 | 1.00 | 1.00 |
| DPG[14] | 0.00 | 0.50 | 0.00 | 0.00 | 0.00 | 0.00 |
| ROYALAC 150[15] | 0.00 | 0.00 | 0.25 | 0.25 | 0.25 | 0.25 |
| SULFUR 21-10[16] | 2.00 | 2.00 | 2.25 | 2.25 | 2.25 | 2.25 |
| TOTAL | 177.50 | 188.80 | 189.10 | 190.10 | 189.10 | 190.10 |

[12] MB-2 is the batch provided as set forth in Table III.
[13] N-t-butyl-2-benzothiazole sulfenamide available from Uniroyal Chemical Company.
[14] Diphenyl guanidine accelerator available from Uniroyal Chemical Company.
[15] Tetraalkyl ($C_{12}$-$C_{14}$) thiuram disulfide available from Uniroyal Chemical Company having an average molecular weight of 916.
[16] Sulfur available from C. P. Hall.

Results

The compounded stocks prepared above were then sheeted out and cut for cure. The samples were cured for the times and at the temperatures indicated in Table V and their physical properties evaluated. The results are summarized in Table V below. Note that in Table V, cure characteristics were determined using a Monsanto rheometer ODR 2000 (1° C. ARC, 100 cpm): MH is the maximum torque and ML is the minimum torque. Scorch safety ($t_s2$) is the time to 2 units above minimum torque (ML), cure time ($t_{50}$) is the time to 50% of delta torque above minimum and cure time ($t_{90}$) is the time to 90% of delta torque above minimum. Tensile Strength, Elongation and Modulus were measured following procedures in ASTM D-412. Examples 1-2 illustrate rubber compositions within the scope of this invention. Comparative Examples A-D illustrate rubber compositions outside the scope of this invention.

TABLE V

CURED PHYSICAL PROPERTIES

| Comp. Ex./Ex. | A | B | C | D | 1 | 2 |
|---|---|---|---|---|---|---|
| Cured Characteristics obtained at 160° C. | | | | | | |
| ML (lb-in.) | 6.78 | 6.77 | 6.85 | 6.87 | 6.85 | 6.26 |
| MH (lb-in.) | 40.34 | 30.86 | 33.36 | 37.28 | 33.76 | 38.40 |
| Scorch safety $t_s1$ (min) | 2.37 | 2.48 | 3.07 | 2.53 | 3.12 | 2.68 |
| Scorch safety $t_s2$ (min) | 2.69 | 3.08 | 3.77 | 3.27 | 3.85 | 3.24 |
| Cure time $t_{50}$ (min) | 3.92 | 5.54 | 5.54 | 5.15 | 5.69 | 4.86 |
| Cure time $t_{90}$ (min) | 5.41 | 9.07 | 6.95 | 6.51 | 7.31 | 6.05 |
| Cured at 160° C. | | | | | | |
| Cure Time @ 160° C. (min) | 7.00 | 11.00 | 9.00 | 9.00 | 9.00 | 8.00 |
| Tensile Strength (Mpa) | 27.73 | 22.44 | 26.95 | 26.95 | 26.14 | 27.95 |
| Elongation, % at Break | 519.00 | 565.00 | 606.00 | 603.00 | 618.00 | 614.00 |
| 100% Modulus (Mpa) | 2.93 | 1.72 | 2.03 | 2.10 | 1.88 | 2.35 |
| 200% Modulus (Mpa) | 8.52 | 4.46 | 5.45 | 5.81 | 4.93 | 6.44 |
| 300% Modulus (Mpa) | 15.20 | 8.64 | 10.28 | 10.78 | 9.32 | 11.56 |
| 400% Modulus (Mpa) | 21.44 | 13.47 | 15.73 | 16.17 | 14.39 | 16.76 |
| 500% Modulus (Mpa) | 26.85 | 18.97 | 21.44 | 21.74 | 20.02 | 22.43 |
| Hardness, Shore A | 63.00 | 62.00 | 64.00 | 61.00 | 65.00 | 64.00 |

TABLE V-continued

CURED PHYSICAL PROPERTIES

| Comp. Ex./Ex. | A | B | C | D | 1 | 2 |
|---|---|---|---|---|---|---|
| Mooney Viscosity($ML_{1+4}$ at 100° C.) | | | | | | |
| $ML_{1+4}$ | 62.00 | 61.00 | 59.00 | 57.00 | 60.50 | 58.00 |
| Mooney Scorch (MS at 135° C.) | | | | | | |
| 3 Pt. Rise Time (min) | 9.46 | 11.30 | 17.42 | 15.33 | 17.17 | 13.07 |
| 18 Pt. Rise Time (min) | 11.77 | 16.84 | 20.61 | 18.75 | 20.54 | 16.44 |
| Aged 2 weeks at 70° C. | | | | | | |
| Tensile Strength (Mpa) | 29.09 | 26.92 | 28.53 | 28.09 | 27.77 | 28.94 |
| Elongation, % at Break | 453.00 | 523.00 | 506.00 | 494.00 | 506.00 | 501.00 |
| 100% Modulus (Mpa) | 4.97 | 3.00 | 3.90 | 3.81 | 3.64 | 4.36 |
| 200% Modulus (Mpa) | 12.98 | 7.97 | 10.17 | 10.43 | 9.50 | 11.27 |
| 300% Modulus (Mpa) | 20.71 | 14.15 | 17.13 | 17.48 | 16.20 | 18.28 |
| 400% Modulus (Mpa) | 26.60 | 20.28 | 23.30 | 23.55 | 22.42 | 24.22 |
| 500% Modulus (Mpa) | | 25.03 | 27.62 | | 26.97 | |
| Hardness, Shore A | 73.00 | 72.00 | 71.00 | 72.00 | 74.00 | 76.00 |
| Tangent Delta 60° C. (10 Hz) [RPA-2000] | | | | | | |
| % Strain | | | | | | |
| 0.7 | 0.101 | 0.086 | 0.087 | 0.072 | 0.088 | 0.062 |
| 1.0 | 0.124 | 0.098 | 0.093 | 0.079 | 0.094 | 0.074 |
| 2.0 | 0.172 | 0.119 | 0.113 | 0.106 | 0.111 | 0.101 |
| 5.0 | 0.199 | 0.145 | 0.137 | 0.125 | 0.136 | 0.124 |
| 7.0 | 0.199 | 0.148 | 0.140 | 0.130 | 0.140 | 0.127 |
| 14.0 | 0.188 | 0.157 | 0.147 | 0.149 | 0.146 | 0.139 |
| Dynamic Modulus (G', kPa) | | | | | | |
| % Strain | | | | | | |
| 0.7 | 5324.8 | 3366.2 | 3259.1 | 4016.5 | 3488.6 | 3817.6 |
| 1.0 | 4792.5 | 3175.0 | 3114.9 | 3803.4 | 3306.1 | 3672.3 |
| 2.0 | 3549.3 | 2751.5 | 2713.2 | 3281.5 | 2868.9 | 3142.2 |
| 5.0 | 2457.7 | 2163.4 | 2178.3 | 2551.2 | 2245.2 | 2462.0 |
| 7.0 | 2199.5 | 1967.7 | 1980.7 | 2300.5 | 2042.7 | 2202.6 |
| 14.0 | 1738.2 | 1535.5 | 1564.9 | 1617.7 | 1610.1 | 1723.7 |
| Monsanto Flex to Fatigue | | | | | | |
| Kilocycle to failure | | | | | | |
| 1 | 121.6 | 258.5 | 194.4 | 154.4 | 165.9 | 226.8 |
| 2 | 134.4 | 287.0 | 211.9 | 242.2 | 185.3 | 278.8 |
| 3 | 136.8 | 299.9 | 213.5 | 250.0 | 243.9 | 329.2 |
| 4 | 155.3 | 341.1 | 218.8 | 283.2 | 250.9 | 378.3 |
| 5 | 161.8 | 358.2 | 220.7 | 288.4 | 265.4 | 473.9 |
| 6 | 166.0 | 386.3 | 222.9 | 307.1 | 312.3 | 475.1 |
| Average of six | 146.0 | 321.8 | 213.7 | 253.7 | 237.3 | 360.4 |
| Average of four | 147.0 | 321.6 | 216.2 | 266.0 | 236.4 | 365.1 |
| Din Abrasion Index | | | | | | |
| 1 | 98.4 | 87.3 | 86.1 | 92.7 | 94.2 | 89.4 |
| 2 | 96.3 | 87.7 | 85.1 | 93.0 | 93.1 | 92.8 |
| 3 | 96.8 | 86.2 | 85.1 | 94.6 | 88.2 | 94.2 |
| Average | 97.2 | 87.1 | 85.4 | 93.5 | 91.8 | 92.1 |

It can be seen from the above data that the rubber compositions of Examples 1 and 2 containing a high molecular weight thiuram disulfide, a nitrogen-containing compound and a polyalkylene oxide (within the scope of the present invention) provide equivalent to improved performance when compared to the rubber composition of Comparative Example A containing carbon black, the rubber composition of Comparative Example B containing only diphenylguanidine and no polyalkylene oxide, nitrogen-containing compound and thiuram disulfide; the rubber composition of Comparative Examples C and D containing a high molecular weight thiuram disulfide and a polyalkylene oxide, and no nitrogen-containing compound. For example, the tangent delta value of the rubber composition of Example 2 was significantly lower than the rubber compositions of Comparative Examples A-D. The tangent delta value for the rubber composition of Example 1 was also lower compared to the rubber compositions of Comparative Examples A-D. Additionally, the abrasion indexes of the rubber compositions of Examples 1 and 2 were very slightly lower compared to the rubber composition of Comparative Example A, which is experimental error range.

Furthermore, the modulus, tensile strength, and hardness for Examples 1-2 were comparable to those of Examples A-D. Thus, by replacing 0.5 phr of diphenyl guanidine with 0.25 phr of tetraalkyl ($C_{12}$-$C_{14}$) thiuram disulfide, the rolling resistance of the rubber composition has been significantly improved without any sacrifice in physical properties resulting in an economical cost advantage being realized.

COMPARATIVE EXAMPLES E-H AND
EXAMPLES 3-4

Employing the ingredients indicated in Tables VI, VII and VIII (which are listed in parts per hundred of rubber by weight), several rubber compositions were compounded using the same general procedure outlined in Examples 1 and 2.

TABLE VI

PHASE I

| Comp. Ex./Ex. | E | F | G | H | 3 | 4 |
|---|---|---|---|---|---|---|
| SIR-20 | 100.00 | 100.00 | 100.00 | 100.00 | 100.00 | 100.00 |
| N-220 BLACK | 59.00 | 5.00 | 5.00 | 5.00 | 5.00 | 5.00 |
| ZEOSIL 1165 | 0.00 | 60.00 | 60.00 | 60.00 | 60.00 | 60.00 |
| SUNDEX 790 | 7.00 | 7.00 | 7.00 | 7.00 | 7.00 | 7.00 |
| SILQUEST A-1589[17] | 0.00 | 4.30 | 3.23 | 3.23 | 3.23 | 3.23 |
| KETTLITZ AKTIOL | 0.00 | 0.00 | 1.50 | 2.50 | 0.00 | 0.00 |
| KETTLITZ ACTIVIN | 0.00 | 0.00 | 0.00 | 0.00 | 1.50 | 2.50 |
| MB-3: TOTAL | 166.00 | 176.30 | 176.73 | 177.73 | 176.73 | 177.73 |

[17]Disulfide silane coupling agent available from OSI Specialty Chemicals.

TABLE VI

PHASE VII

| Comp. Ex./Ex. | E | F | G | H | 3 | 4 |
|---|---|---|---|---|---|---|
| MB-3[18] | 166.00 | 176.30 | 176.73 | 177.73 | 176.73 | 177.73 |
| KADOX 911 C | 3.00 | 3.00 | 3.00 | 3.00 | 3.00 | 3.00 |
| FLEXZONE 7P | 2.00 | 2.00 | 2.00 | 2.00 | 2.00 | 2.00 |
| STEARIC ACID | 2.00 | 2.00 | 2.00 | 2.00 | 2.00 | 2.00 |

TABLE VI-continued

PHASE VII

| Comp. Ex./Ex. | E | F | G | H | 3 | 4 |
|---|---|---|---|---|---|---|
| SUNPROOF IMP. WAX | 1.50 | 1.50 | 1.50 | 1.50 | 1.50 | 1.50 |
| MB-4: TOTAL | 174.50 | 184.80 | 185.23 | 186.23 | 185.23 | 186.23 |

[18]MB-3 is the batch provided as set forth in Table V.

TABLE VII

PHASE III

| Comp. Ex./Ex. | E | F | G | H | 3 | 4 |
|---|---|---|---|---|---|---|
| MB-4[19] | 174.50 | 184.80 | 185.23 | 186.23 | 185.23 | 186.23 |
| DELAC NS | 1.00 | 1.00 | 1.00 | 1.00 | 1.00 | 1.00 |
| DPG | 0.00 | 0.50 | 0.00 | 0.00 | 0.00 | 0.00 |
| ROYALAC 150 | 0.00 | 0.00 | 0.25 | 0.25 | 0.25 | 0.25 |
| SULFUR 21-10 | 2.00 | 2.25 | 2.40 | 2.40 | 2.40 | 2.40 |
| TOTAL | 177.50 | 188.55 | 188.88 | 189.88 | 188.88 | 189.88 |

[19]MB-4 is the batch provided as set forth in Table VI.

Results

The compounded stocks prepared above were then sheeted out and cut for cure. The samples were cured for the times and at the temperatures indicated in Table VIII and their physical properties evaluated. The results are summarized in Table VIII below. Examples 3 and 4 illustrate rubber compositions within the scope of this invention. Comparative Examples E-H illustrate rubber compositions outside the scope of this invention.

TABLE VIII

CURED PHYSICAL PROPERTIES

| Comp. Ex./Ex. | E | F | G | H | 3 | 4 |
|---|---|---|---|---|---|---|
| Cured Characteristics obtained at 160° C. | | | | | | |
| ML (lb-in.) | 7.24 | 8.28 | 8.79 | 8.85 | 8.13 | 7.82 |
| MH (lb-in.) | 41.36 | 33.24 | 38.89 | 42.47 | 38.36 | 40.45 |
| Scorch safety $t_s1$ (min) | 2.36 | 2.46 | 1.93 | 1.70 | 1.95 | 2.20 |
| Scorch safety $t_s2$ (min) | 2.71 | 3.43 | 2.65 | 2.19 | 3.82 | 3.84 |
| Cure time $t_{50}$ (min) | 4.02 | 6.29 | 6.20 | 6.08 | 6.34 | 6.17 |
| Cure time $t_{90}$ (min) | 5.55 | 11.05 | 7.79 | 7.49 | 7.89 | 7.53 |
| Cured at 160° C. | | | | | | |
| Cure Time @ 160° C. (min) | 8.00 | 13.00 | 10.00 | 10.00 | 10.00 | 10.00 |
| Tensile Strength (Mpa) | 28.82 | 22.66 | 26.17 | 26.52 | 28.08 | 27.20 |
| Elongation, % at Break | 537.00 | 619.00 | 637.00 | 627.00 | 644.00 | 635.00 |
| 100% Modulus (Mpa) | 2.98 | 1.32 | 1.70 | 1.85 | 1.64 | 1.80 |
| 200% Modulus (Mpa) | 8.64 | 3.21 | 4.53 | 5.05 | 4.28 | 4.75 |
| 300% Modulus (Mpa) | 15.36 | 6.71 | 8.62 | 9.40 | 8.68 | 9.01 |
| 400% Modulus (Mpa) | 21.68 | 11.20 | 13.44 | 14.37 | 13.99 | 14.03 |
| 500% Modulus (Mpa) | 26.98 | 16.35 | 18.72 | 19.85 | 19.95 | 19.84 |
| Hardness, Shore A. | 65.00 | 60.00 | 64.00 | 65.00 | 61.00 | 65.00 |
| Mooney Viscosity($ML_{1+4}$ at 100° C.) | | | | | | |
| $ML_{1+4}$ | 64.00 | 68.50 | 71.00 | 68.00 | 70.00 | 68.50 |
| Mooney Scorch (MS at 135° C.) | | | | | | |
| 3 Pt. Rise Time (min) | 11.63 | 17.52 | 20.78 | 19.54 | 20.58 | 19.48 |
| 18 Pt. Rise Time (min) | 13.70 | 22.32 | 23.05 | 21.59 | 22.81 | 21.89 |

TABLE VIII-continued

CURED PHYSICAL PROPERTIES

| Comp. Ex./Ex. | E | F | G | H | 3 | 4 |
|---|---|---|---|---|---|---|
| Aged 2 weeks at 70° C. | | | | | | |
| Tensile Strength (Mpa) | 28.53 | 27.59 | 27.99 | 28.69 | 29.20 | 28.45 |
| Elongation, % at Break | 439.00 | 565.00 | 504.00 | 531.00 | 508.00 | 517.00 |
| 100% Modulus (Mpa) | 4.86 | 2.80 | 3.85 | 3.78 | 3.63 | 4.01 |
| 200% Modulus (Mpa) | 12.60 | 7.53 | 10.00 | 9.92 | 10.09 | 10.15 |
| 300% Modulus (Mpa) | 20.55 | 13.57 | 16.88 | 16.76 | 17.55 | 16.91 |
| 400% Modulus (Mpa) | 26.92 | 19.53 | 22.97 | 22.72 | 23.99 | 22.93 |
| 500% Modulus (Mpa) | | 24.70 | 27.20 | 27.39 | 28.95 | 27.60 |
| Hardness, Shore A. | 74.00 | 68.00 | 74.00 | 72.00 | 70.00 | 69.00 |
| Tangent Delta 60° C. (10 Hz) [RPA-2000] % Strain | | | | | | |
| 0.7 | 0.099 | 0.082 | 0.072 | 0.060 | 0.070 | 0.064 |
| 1.0 | 0.127 | 0.091 | 0.086 | 0.075 | 0.082 | 0.079 |
| 2.0 | 0.179 | 0.135 | 0.123 | 0.108 | 0.106 | 0.104 |
| 5.0 | 0.212 | 0.166 | 0.161 | 0.146 | 0.147 | 0.141 |
| 7.0 | 0.210 | 0.171 | 0.164 | 0.151 | 0.151 | 0.147 |
| 14.0 | 0.200 | 0.186 | 0.179 | 0.172 | 0.164 | 0.157 |
| Dynamic Modulus (G', kPa) % Strain | | | | | | |
| 0.7 | 5653.7 | 5531.3 | 6242.8 | 7176.2 | 5982.7 | 6724.8 |
| 1.0 | 5120.4 | 5267.9 | 5934.6 | 6759.8 | 5535.7 | 6262.5 |
| 2.0 | 3814.3 | 4276.1 | 4866.3 | 5653.2 | 4579.4 | 5196.9 |
| 5.0 | 2553.4 | 2984.8 | 3411.9 | 3848.6 | 3274.8 | 3643.6 |
| 7.0 | 2235.5 | 2562.2 | 2904.9 | 3253.0 | 2800.9 | 3093.9 |
| 14.0 | 1756.6 | 1831.5 | 2009.4 | 2198.8 | 1954.3 | 2148.6 |
| Monsanto Flex to Fatigue Kilocycle to failure | | | | | | |
| 1 | 45.5 | 219.1 | 190.9 | 75.3 | 128.2 | 167.9 |
| 2 | 69.1 | 231.5 | 203.4 | 269.7 | 139.9 | 185.9 |
| 3 | 126.3 | 248.3 | 229.9 | 271.7 | 165.3 | 208.9 |
| 4 | 137.1 | 267.8 | 250.7 | 279.2 | 166.5 | 227.9 |
| 5 | 149.8 | 291.2 | 251.0 | 280.7 | 170.9 | 229.7 |
| 6 | 154.6 | 323.2 | 263.7 | 287.0 | 183.3 | 230.3 |
| Average of six | 113.7 | 263.5 | 231.6 | 243.8 | 159.0 | 208.4 |
| Average of four | 120.6 | 259.7 | 233.8 | 275.3 | 160.7 | 213.1 |
| Din Abrasion Index | | | | | | |
| 1 | 90.6 | 89.5 | 95.1 | 90.9 | 90.4 | 91.7 |
| 2 | 94.9 | 88.2 | 96.3 | 91.9 | 91.9 | 89.0 |
| 3 | 99.7 | 81.5 | 96.5 | 91.6 | 87.9 | 91.2 |
| Average | 95.1 | 86.4 | 96.0 | 91.4 | 90.1 | 90.6 |

It can be seen from the above data that the rubber compositions of Examples 3 and 4 containing a high molecular weight thiuram disulfide, a nitrogen-containing compound and a polyalkylene oxide (within the scope of the present invention) provide equivalent to improved performance when compared to the rubber composition of Comparative Example E containing carbon black, the rubber composition of Comparative Example F containing only diphenylguanidine and no polyalkylene oxide, nitrogen-containing compound and thiuram disulfide; the rubber composition of Comparative Examples G and H containing a high molecular weight thiuram disulfide and a polyalkylene oxide, and no nitrogen-containing compound. For example, the tangent delta value of the rubber compositions Examples 3 and 4 were significantly lower than the rubber compositions of Comparative Examples E-G.

Additionally, the abrasion indexes of the rubber compositions of Examples 3-4 were equivalent as compared to the rubber compositions of Comparative Examples E, which are experimental error range. The cure rates of Examples. 3-4 were also significantly faster as compared to that of Comparative Example E.

Furthermore, the Modulus, tensile strength, and hardness for Examples 3-4 were comparable to those of Examples E-H.

Thus, by replacing 0.5 phr of diphenyl guanidine with 0.25 phr of tetraalkyl ($C_{12}$-$C_{14}$) thiuram disulfide, the rolling resistance of the rubber composition has been significantly improved without any sacrifice in physical properties resulting in an economical cost advantage being realized.

COMPARATIVE EXAMPLES I-L AND EXAMPLES 5-6

Employing the ingredients indicated in Tables IX, X, and XI (which are listed in parts per hundred of rubber by weight), several rubber compositions were compounded using the same general procedure outlined in Examples 1 and 2.

TABLE IX

| | PHASE I | | | | | |
|---|---|---|---|---|---|---|
| Comp. Ex./Ex. | I | J | K | L | 5 | 6 |
| SIR-20 | 100.00 | 100.00 | 100.00 | 100.00 | 100.00 | 100.00 |
| N-220 BLACK | 59.00 | 5.00 | 5.00 | 5.00 | 5.00 | 5.00 |
| ZEOSIL 1165 | 0.00 | 60.00 | 60.00 | 60.00 | 60.00 | 60.00 |

TABLE IX-continued

| | PHASE I | | | | | |
|---|---|---|---|---|---|---|
| Comp. Ex./Ex. | I | J | K | L | 5 | 6 |
| SUNDEX 790 | 7.00 | 7.00 | 7.00 | 7.00 | 7.00 | 0.00 |
| NXT (Y-15099)[20] | 0.00 | 5.5 | 4.13 | 4.13 | 4.13 | 4.13 |
| KETTLITZ AKTIOL | 0.00 | 0.00 | 1.50 | 2.50 | 0.00 | 0.00 |
| KETTLITZ ACTIVIN | 0.00 | 0.00 | 0.00 | 0.00 | 1.50 | 2.50 |
| MB 5: TOTAL | 166.00 | 177.00 | 177.63 | 178.63 | 177.63 | 171.63 |

[20]Silica coupler available from OSI Specialty Chemicals.

TABLE X

| | PHASE II | | | | | |
|---|---|---|---|---|---|---|
| Comp. Ex./Ex. | I | J | K | L | 5 | 6 |
| MB-5[21] | 166.00 | 177.00 | 177.63 | 178.63 | 177.63 | 171.63 |
| KADOX 911C | 3.00 | 3.00 | 3.00 | 3.00 | 3.00 | 3.00 |
| FLEXZONE 7P | 2.00 | 2.00 | 2.00 | 2.00 | 2.00 | 2.00 |
| STEARIC ACID | 2.00 | 2.00 | 2.00 | 2.00 | 2.00 | 2.00 |
| SUNPROOF IMP. WAX | 0.00 | 1.50 | 1.50 | 1.50 | 1.50 | 1.50 |
| MB-6: TOTAL | 173.00 | 185.50 | 186.13 | 187.13 | 186.13 | 180.13 |

[21]MB-5 is the batch provided as set forth in Table IX.

TABLE XI

| | PHASE III | | | | | |
|---|---|---|---|---|---|---|
| Comp. Ex./Ex. | I | J | K | L | 5 | 6 |
| MB-6[22] | 173.00 | 185.50 | 186.13 | 187.13 | 186.13 | 180.13 |
| DELAC NS | 1.00 | 1.00 | 1.00 | 1.00 | 1.00 | 1.00 |
| DPG | 0.00 | 0.50 | 0.00 | 0.00 | 0.00 | 0.00 |
| ROYALAC 150 | 0.00 | 0.00 | 0.25 | 0.25 | 0.25 | 0.25 |
| SULFUR 21-10 | 2.00 | 2.25 | 2.40 | 2.40 | 2.40 | 2.40 |
| TOTAL | 176.00 | 189.25 | 189.78 | 190.78 | 189.78 | 183.78 |

[22]MB-6 is the batch provided as set forth in Table X.

Results

The compounded stocks prepared above were then sheeted out and cut for cure. The samples were cured for the times and at the temperatures indicated in Table XII and their physical properties evaluated. The results are summarized in Table XII below. Examples 5-6 illustrate rubber compositions within the scope of this invention. Comparative Examples I-L illustrate rubber compositions outside the scope of this invention.

TABLE XII

| | CURED PHYSICAL PROPERTIES | | | | | |
|---|---|---|---|---|---|---|
| Comp. Ex./Ex. | I | J | K | L | 5 | 6 |
| Cured Characteristics obtained at 160° C. | | | | | | |
| ML (lb-in.) | 6.94 | 5.88 | 6.83 | 8.18 | 7.58 | 6.45 |
| MH (lb-in.) | 40.63 | 28.54 | 33.87 | 39.28 | 36.25 | 37.34 |
| Scorch safety $t_s1$ (min) | 2.31 | 3.28 | 4.16 | 2.10 | 3.99 | 3.45 |
| Scorch safety $t_s2$ (min) | 2.65 | 4.00 | 5.25 | 4.46 | 4.89 | 3.93 |
| Cure time $t_{50}$ (min) | 3.94 | 6.19 | 6.90 | 6.31 | 6.48 | 5.23 |
| Cure time $t_{90}$ (min) | 5.43 | 9.76 | 8.18 | 7.45 | 7.74 | 6.47 |
| Cured at 160° C. | | | | | | |
| Cure Time @ 160° C.(min) | 8.00 | 12.00 | 10.00 | 10.00 | 10.00 | 10.00 |
| Tensile Strength (Mpa) | 28.69 | 22.35 | 25.94 | 26.09 | 27.10 | 27.73 |
| Elongation, % at Break | 518.00 | 631.00 | 668.00 | 658.00 | 657.00 | 643.00 |
| 100% Modulus (Mpa) | 2.89 | 1.48 | 1.75 | 1.64 | 1.86 | 2.00 |
| 200% Modulus (Mpa) | 8.58 | 3.59 | 4.44 | 4.08 | 4.63 | 5.26 |
| 300% Modulus (Mpa) | 15.62 | 6.85 | 8.22 | 8.00 | 8.80 | 9.64 |
| 400% Modulus (Mpa) | 22.19 | 10.89 | 12.64 | 12.60 | 13.40 | 14.56 |
| 500% Modulus (Mpa) | 27.84 | 15.70 | 17.74 | 17.95 | 18.86 | 20.21 |
| Hardness, Shore A. | 65.00 | 57.00 | 60.00 | 61.00 | 61.00 | 63.00 |
| Mooney Viscosity($ML_{1+4}$ at 100° C.) | | | | | | |
| $ML_{1+4}$ | 64.00 | 59.00 | 62.00 | 66.00 | 68.00 | 64.50 |
| Mooney Scorch (MS at 135° C.) | | | | | | |
| 3 Pt. Rise Time (min) | 11.37 | 17.77 | 24.15 | 22.37 | 20.60 | 15.25 |
| 18 Pt. Rise Time (min) | 13.61 | 23.10 | 26.52 | 24.80 | 23.05 | 17.61 |
| Aged 2 weeks at 70° C. | | | | | | |
| Tensile Strength (Mpa) | 28.70 | 26.07 | 26.83 | 26.70 | 27.86 | 27.16 |
| Elongation, % at Break | 445.00 | 619.00 | 554.00 | 555.00 | 567.00 | 547.00 |

TABLE XII-continued

CURED PHYSICAL PROPERTIES

| Comp. Ex./Ex. | I | J | K | L | 5 | 6 |
|---|---|---|---|---|---|---|
| 100% Modulus (Mpa) | 4.64 | 2.32 | 3.21 | 2.90 | 3.23 | 3.36 |
| 200% Modulus (Mpa) | 12.72 | 6.11 | 8.30 | 7.81 | 8.46 | 8.67 |
| 300% Modulus (Mpa) | 20.63 | 10.79 | 14.04 | 13.65 | 14.31 | 14.44 |
| 400% Modulus (Mpa) | 26.54 | 15.80 | 19.61 | 19.34 | 20.02 | 20.06 |
| 500% Modulus (Mpa) | | 20.82 | 24.52 | 24.33 | 25.10 | 25.03 |
| Hardness, Shore A. | 72.00 | 64.00 | 70.00 | 70.00 | 70.00 | 69.00 |
| Tangent Delta 60° C. (10 Hz) [RPA-2000] % Strain | | | | | | |
| 0.7 | 0.009 | 0.095 | 0.093 | 0.074 | 0.083 | 0.063 |
| 1.0 | 0.119 | 0.101 | 0.098 | 0.091 | 0.084 | 0.073 |
| 2.0 | 0.163 | 0.119 | 0.128 | 0.116 | 0.112 | 0.092 |
| 5.0 | 0.203 | 0.141 | 0.149 | 0.143 | 0.132 | 0.114 |
| 7.0 | 0.200 | 0.141 | 0.150 | 0.148 | 0.137 | 0.116 |
| 14.0 | 0.184 | 0.143 | 0.158 | 0.158 | 0.141 | 0.117 |
| Dynamic Modulus (G', kPa) % Strain | | | | | | |
| 0.7 | 5531.3 | 2731.2 | 4131.3 | 5516.0 | 4337.8 | 3871.2 |
| 1.0 | 4929.1 | 2595.7 | 3890.8 | 5114.9 | 4104.0 | 3650.4 |
| 2.0 | 3778.8 | 2213.2 | 3270.6 | 4300.7 | 3467.3 | 3120.3 |
| 5.0 | 2556.6 | 1784.1 | 2433.3 | 3159.0 | 2594.8 | 2416.3 |
| 7.0 | 2282.2 | 1630.3 | 2198.8 | 2722.8 | 2318.9 | 2177.3 |
| 14.0 | 1808.6 | 1331.6 | 1666.7 | 1970.4 | 1772.2 | 1734.4 |
| Monsanto Flex to Fatigue Kilocycle to failure | | | | | | |
| 1 | 107.2 | 185.7 | 173.0 | 228.5 | 190.1 | 233.0 |
| 2 | 113.8 | 199.6 | 188.3 | 238.7 | 202.0 | 261.4 |
| 3 | 125.8 | 202.0 | 193.9 | 239.5 | 249.9 | 296.0 |
| 4 | 138.9 | 203.3 | 206.2 | 248.6 | 251.8 | 307.3 |
| 5 | 141.0 | 228.7 | 217.0 | 259.1 | 309.7 | 311.8 |
| 6 | 161.8 | 231.4 | 247.6 | 259.7 | 314.7 | 347.6 |
| Average of six | 134.1 | 208.5 | 204.3 | 245.7 | 253.0 | 292.9 |
| Average of four | 129.9 | 208.4 | 201.4 | 246.5 | 253.4 | 294.1 |
| Unaged Din Abrasion Index | | | | | | |
| 1 | 94.5 | 52.3 | 77.2 | 77.9 | 71.2 | 85.3 |
| 2 | 99.1 | 56.6 | 41.9 | 81.5 | 71.8 | 77.6 |
| 3 | 98.8 | 58.8 | 73.7 | 74.2 | 67.7 | 77.9 |
| Average | 97.5 | 55.3 | 77.6 | 77.9 | 70.3 | 80.2 |
| Aged 2 weeks at 70° C. Din Abrasion Index | | | | | | |
| 1 | 90.6 | 63.6 | 80.0 | 77.8 | 80.1 | 81.2 |
| 2 | 91.0 | 69.1 | 77.1 | 75.7 | 89.2 | 83.4 |
| 3 | 91.7 | 72.9 | 70.2 | 78.0 | 78.5 | 82.7 |
| Average | 91.4 | 68.6 | 78.8 | 77.2 | 79.6 | 82.4 |

It can be seen from the above data that the rubber compositions of Examples 5 and 6 containing a high molecular weight thiuram disulfide, a nitrogen-containing compound and a polyalkylene oxide (within the scope of the present invention) provide equivalent to improved performance when compared to the rubber composition of Comparative Example I containing carbon black, the rubber composition of Comparative Example J containing only diphenylguanidine, and no polyalkylene oxide, nitrogen-containing compound and thiuram disulfide; the rubber composition of Comparative Examples K and L containing a high molecular weight thiuram disulfide and a polyalkylene oxide, and no nitrogen-containing compound. For example, the tangent delta value of the rubber compositions of Examples 5 and 6 were significantly lower than the rubber compositions of Comparative Examples I-L.

Additionally, the abrasion index of Example 5 was significantly lower as compared to those of Comparative Example I.

The cure rate of Example. 6 was significantly faster as compared to those of Comparative Examples I-L.

Furthermore, the Modulus, tensile strength, and hardness for Examples 5-6 were comparable to those of Examples I-L. Thus, by replacing 0.5 phr of diphenyl guanidine with 0.25 phr of tetraalkyl ($C_{12}$-$C_{14}$) thiuram disulfide, the rolling resistance of the rubber composition has been significantly improved without any sacrifice in physical properties resulting in an economical cost advantage being realized.

COMPARATIVE EXAMPLES M-Q AND EXAMPLE 7

Employing the ingredients indicated in Tables XIII, XIV and XV (which are listed in parts per hundred of rubber by weight), several rubber compositions were compounded using the same general procedure outlined in Examples 1 and 2.

TABLE XIII

PHASE I

| Comp. Ex./Ex. | M | N | O | P | Q | 7 |
|---|---|---|---|---|---|---|
| SIR-20 | 100.00 | 100.00 | 100.00 | 100.00 | 100.00 | 100.00 |
| N-220 BLACK | 59.00 | 5.00 | 5.00 | 5.00 | 5.00 | 5.00 |
| ZEOSIL 1165 | 0.00 | 60.00 | 60.00 | 60.00 | 60.00 | 60.00 |
| SUNDEX 790 | 7.00 | 7.00 | 7.00 | 7.00 | 7.00 | 7.00 |
| SILQUEST A-1289 | 0.00 | 4.80 | 3.60 | 3.60 | 3.60 | 3.60 |
| CARBOWAX 3350[23] | 0.00 | 0.00 | 2.50 | 3.00 | 0.00 | 0.00 |
| KETTLITZ AKTIOL | 0.00 | 0.00 | 0.00 | 0.00 | 3.00 | 0.00 |
| KETTLITZ ACTIVIN | 0.00 | 0.00 | 0.00 | 0.00 | 0.00 | 2.50 |
| MB-7: TOTAL | 166.00 | 176.80 | 178.10 | 178.60 | 178.60 | 178.10 |

[23]Polyethylene glycol possessing a weight average molecular weight of 3000-3700 available from Harwick Standard Distribution Corp. (Akron, Ohio).

TABLE XIV

PHASE II

| Comp. Ex./Ex. | M | N | O | P | Q | 7 |
|---|---|---|---|---|---|---|
| MB-7[24] | 166.00 | 176.80 | 178.10 | 178.60 | 178.60 | 178.10 |
| KADOX 911C | 3.00 | 3.00 | 3.00 | 3.00 | 3.00 | 3.00 |
| FLEXZONE 7P | 2.00 | 2.00 | 2.00 | 2.00 | 2.00 | 2.00 |
| STEARIC ACID | 2.00 | 2.00 | 2.00 | 2.00 | 2.00 | 2.00 |
| SUNPROOF IMP. WAX | 1.50 | 1.50 | 1.50 | 1.50 | 1.50 | 1.50 |
| MB-8: TOTAL | 174.50 | 185.30 | 186.60 | 187.10 | 187.10 | 186.60 |

[24]MB-7 is the batch provided as set forth in Table XIII.

TABLE XV

PHASE III

| Comp. Ex./Ex. | M | N | O | P | Q | 7 |
|---|---|---|---|---|---|---|
| MB-8[25] | 174.50 | 185.30 | 186.60 | 187.10 | 187.10 | 186.60 |
| DELAC NS | 1.00 | 1.00 | 1.00 | 1.00 | 1.00 | 1.00 |
| DPG | 0.00 | 1.00 | 0.00 | 0.00 | 0.00 | 0.00 |
| ROYALAC 150 | 0.00 | 0.00 | 0.40 | 0.40 | 0.40 | 4.00 |
| SANTOGARD PVI[26] | 0.20 | 0.20 | 0.00 | 0.00 | 0.00 | 0.20 |
| SULFUR 21-10 | 2.00 | 2.00 | 2.25 | 2.25 | 2.25 | 2.25 |
| TOTAL | 177.70 | 189.50 | 190.25 | 190.75 | 190.75 | 194.05 |

[25]MB-8 is the batch provided as set forth in Table XIV.

[26]Cyclohexylthiophthalimide available from Flexsys.

Results

The compounded stocks prepared above were then sheeted out and cut for cure. The samples were cured for the times and at the temperatures indicated in Table XVI and their physical properties evaluated. The results are summarized in Table XVI below. Example 7 illustrates a rubber composition within the scope of this invention. Comparative Examples M-Q illustrate rubber compositions outside the scope of this invention.

TABLE XVI

CURED PHYSICAL PROPERTIES

| Comp. Ex./Ex. | M | N | O | P | Q | 7 |
|---|---|---|---|---|---|---|
| Cured Characteristics obtained at 160° C. | | | | | | |
| ML (lb-in.) | 6.12 | 7.57 | 9.45 | 9.85 | 8.19 | 6.15 |
| MH (lb-in.) | 38.81 | 37.06 | 46.24 | 47.16 | 41.95 | 38.39 |
| Scorch safety $t_s1$ (min) | 3.33 | 2.49 | 0.91 | 0.72 | 2.24 | 3.07 |
| Scorch safety $t_s2$ (min) | 4.02 | 3.26 | 2.69 | 2.40 | 3.27 | 3.90 |
| Cure time $t_{50}$ (min) | 6.12 | 5.97 | 4.72 | 4.57 | 5.27 | 6.17 |
| Cure time $t_{90}$ (min) | 7.87 | 8.37 | 5.66 | 5.52 | 6.38 | 7.24 |
| Cured at 160° C. | | | | | | |
| Cure Time @ 160° C. (min) | 10.00 | 11.00 | 8.00 | 8.00 | 8.00 | 9.00 |
| Tensile Strength (Mpa) | | | | | | |
| Elongation, % at Break | 28.86 | 26.73 | 27.35 | 28.16 | 27.86 | 28.43 |
| 100% Modulus (Mpa) | 550.00 | 630.00 | 620.00 | 660.00 | 629.00 | 630.00 |
| 200% Modulus (Mpa) | 2.69 | 1.97 | 2.06 | 2.12 | 2.15 | 2.30 |
| 300% Modulus (Mpa) | 7.85 | 5.03 | 5.23 | 5.29 | 5.58 | 6.19 |
| 400% Modulus (Mpa) | 14.24 | 9.43 | 9.88 | 9.60 | 10.30 | 11.26 |
| 500% Modulus (Mpa) | 20.67 | 14.44 | 15.09 | 14.46 | 15.60 | 16.56 |
| Hardness, Shore A. | 26.37 | 19.97 | 20.91 | 20.06 | 21.22 | 21.64 |
| Mooney Viscosity ($ML_{1+4}$ at 100° C.) | | | | | | |
| $ML_{1+4}$ | 63.00 | 64.00 | 64.00 | 66.00 | 65.00 | 65.00 |
| Mooney Scorch (MS at 135° C.) | | | | | | |

TABLE XVI-continued

CURED PHYSICAL PROPERTIES

| Comp. Ex./Ex. | M | N | O | P | Q | 7 |
|---|---|---|---|---|---|---|
| 3 Pt. Rise Time (min) | 17.90 | 14.91 | 15.21 | 13.88 | 17.37 | 18.69 |
| 18 Pt. Rise Time (min) | 21.16 | 21.18 | 18.03 | 16.50 | 20.56 | 24.73 |
| Tangent Delta 60° C. (10 Hz) [RPA-2000] % Strain | | | | | | |
| 0.7 | 0.090 | 0.058 | 0.056 | 0.050 | 0.062 | 0.056 |
| 1.0 | 0.120 | 0.076 | 0.072 | 0.069 | 0.074 | 0.066 |
| 2.0 | 0.179 | 0.099 | 0.092 | 0.097 | 0.097 | 0.086 |
| 5.0 | 0.204 | 0.124 | 0.117 | 0.119 | 0.126 | 0.104 |
| 7.0 | 0.201 | 0.129 | 0.129 | 0.127 | 0.130 | 0.104 |
| 14.0 | 0.189 | 0.140 | 0.157 | 0.156 | 0.145 | 0.111 |
| Dynamic Modulus (G', kPa) % Strain | | | | | | |
| 0.7 | 4835.1 | 4728.0 | 6235.2 | 6717.2 | 4965.2 | 3289.7 |
| 1.0 | 4366.3 | 4502.9 | 5918.2 | 6453.8 | 4705.1 | 3131.3 |
| 2.0 | 3232.3 | 3838.9 | 5246.1 | 5740.6 | 4073.9 | 2759.7 |
| 5.0 | 2283.5 | 2844.5 | 3810.4 | 4080.3 | 3065.5 | 2226.1 |
| 7.0 | 2021.3 | 2533.9 | 3219.3 | 3530.7 | 2722.8 | 2051.9 |
| 14.0 | 1611.6 | 1913.8 | 2176.2 | 2327.3 | 1978.4 | 1665.5 |
| Monsanto Flex to Fatigue Kilocycle to failure | | | | | | |
| 1 | 138.8 | 332.0 | 275.5 | 151.8 | 202.9 | 189.0 |
| 2 | 168.1 | 332.5 | 307.9 | 304.1 | 207.2 | 288.6 |
| 3 | 181.7 | 339.6 | 350.7 | 307.7 | 233.4 | 308.3 |
| 4 | 192.1 | 343.6 | 351.6 | 389.7 | 234.8 | 336.5 |
| 5 | 192.7 | 416.0 | 381.1 | 392.5 | 241.8 | 336.5 |
| 6 | 207.2 | 430.1 | 385.6 | 416.3 | 264.3 | 363.9 |
| Average of six | 180.1 | 365.6 | 342.1 | 327.0 | 230.7 | 303.8 |
| Average of four | 183.6 | 357.9 | 347.8 | 348.5 | 229.3 | 317.5 |
| Unaged Din abrasion Din Abrasion Index | | | | | | |
| 1 | 98.1 | 94.5 | 94.3 | 87.5 | 85.7 | 99.2 |
| 2 | 98.7 | 94.3 | 98.6 | 86.0 | 82.6 | 95.2 |
| 3 | 99.5 | 96.3 | 95.4 | 82.3 | 83.8 | 99.3 |
| Average | 98.8 | 95.0 | 96.1 | 85.3 | 84.0 | 97.9 |
| Aged 2 weeks at 70 C. Din Abrasion Index | | | | | | |
| 1 | 96.8 | 98.1 | 89.3 | 85.5 | 86.9 | 89.7 |
| 2 | 99.6 | 102.3 | 91.1 | 84.7 | 84.9 | 91.3 |
| 3 | 98.1 | 98.6 | 91.6 | 85.2 | 89.4 | 90.3 |
| Average | 98.2 | 99.7 | 90.7 | 85.1 | 87.0 | 90.4 |

It can be seen from the above data that the rubber composition of Example 7 containing a high molecular weight thiuram disulfide, a nitrogen-containing compound and a polyalkylene oxide (within the scope of the present invention) provides equivalent to improved performance when compared to the rubber composition of Comparative Example M containing carbon black, the rubber composition of Comparative Example N containing only diphenylguanidine, and no polyalkylene oxide, nitrogen-containing compound and thiuram disulfide; the rubber composition of Comparative Examples O and P containing a high molecular weight thiuram disulfide, and a high molecular weight polyalkylene oxide and no nitrogen-containing compound; and the rubber composition of Comparative Example Q containing a polyalkylene oxide and a high molecular weight thiuram disulfide, with no nitrogen-containing compound. The tangent delta value of the rubber composition of Example 7 was significantly lower than the rubber compositions of Comparative Examples M-Q.

Additionally, the aged abrasion index of the rubber composition of Example 7 was slightly lower compared to the rubber compositions of Comparative Examples M-N. The cure rate of the rubber composition Example 7 was significantly faster compared to the rubber compositions of Comparative Examples M-Q.

Furthermore, the Modulus, tensile strength, and hardness for the rubber composition of Example 7 was comparable to the rubber compositions of Examples M-Q. Thus, by replacing 1 phr of diphenyl guanidine with 0.4 phr of tetraalkyl ($C_{12}$-$C_{14}$) thiuram disulfide, the rolling resistance of the rubber composition has been significantly improved without any sacrifice in physical properties resulting in an economical cost advantage being realized.

COMPARATIVE EXAMPLE R AND EXAMPLES 8-12

Employing the ingredients indicated in Tables XVII, XVIII and XIX (which are listed in parts per hundred of rubber by weight), several rubber compositions were compounded using the same general procedure outlined in Examples 1 and 2.

TABLE XVII

PHASE I

| Comp. Ex./Ex. | R | 8 | 9 | 10 | 11 | 12 |
|---|---|---|---|---|---|---|
| SIR-20 | 100.00 | 100.00 | 100.00 | 100.00 | 100.00 | 100.00 |
| N-220 BLACK | 59.00 | 5.00 | 5.00 | 5.00 | 5.00 | 5.00 |
| ZEOSIL 1165 | 0.00 | 60.00 | 60.00 | 60.00 | 60.00 | 60.00 |
| SILQUEST A-1289 | 0.00 | 3.60 | 2.60 | 2.00 | 0.00 | 0.00 |
| SILQUEST A-1891[27] | 0.00 | 0.00 | 1.00 | 1.00 | 0.00 | 0.00 |
| SILQUEST A-1589 | 0.00 | 0.00 | 0.00 | 0.00 | 3.23 | 0.00 |
| NXT (Y-15099) | 0.00 | 0.00 | 0.00 | 0.00 | 0.00 | 4.13 |
| KETTLITZ ACTIVIN | 0.00 | 2.50 | 2.50 | 2.50 | 2.50 | 2.50 |
| SUNDEX 790 | 7.00 | 7.00 | 7.00 | 7.00 | 7.00 | 7.00 |
| MB-9: TOTAL | 166.00 | 178.10 | 178.10 | 177.50 | 177.73 | 178.63 |

[27]Mercaptopropyltrimethoxy available from OSI Specialty Chemicals.

TABLE XVIII

PHASE II

| Comp. Ex./Ex. | R | 8 | 9 | 10 | 11 | 12 |
|---|---|---|---|---|---|---|
| MB-9[28] | 166.00 | 178.10 | 178.10 | 177.50 | 177.73 | 178.63 |
| KADOX 911C | 3.00 | 3.00 | 3.00 | 3.00 | 3.00 | 3.00 |
| FLEXZONE 7P | 2.00 | 2.00 | 2.00 | 2.00 | 2.00 | 2.00 |
| STEARIC ACID | 2.00 | 2.00 | 2.00 | 2.00 | 2.00 | 2.00 |
| SUNPROOF IMP. WAX | 1.50 | 1.50 | 1.50 | 1.50 | 1.50 | 1.50 |
| MB-10: TOTAL | 174.50 | 186.60 | 186.60 | 186.00 | 186.23 | 187.13 |

[28]MB-9 is the batch provided as set forth in Table XVII.

TABLE XIX

PHASE III

| Comp. Ex./Ex. | R | 8 | 9 | 10 | 11 | 12 |
|---|---|---|---|---|---|---|
| MB-10[29] | 174.50 | 186.60 | 186.60 | 186.00 | 186.23 | 187.13 |
| DELAC NS | 1.00 | 1.00 | 1.00 | 1.00 | 1.00 | 1.00 |
| ROYALAC 150 | 0.00 | 0.50 | 0.50 | 0.50 | 0.50 | 0.50 |
| SANTOGARD PVI | 0.20 | 0.20 | 0.20 | 0.20 | 0.20 | 0.20 |
| SULFUR 21-10 | 2.00 | 2.25 | 2.25 | 2.40 | 2.40 | 2.40 |
| TOTAL | 177.70 | 190.55 | 190.55 | 190.10 | 190.33 | 191.23 |

[29]MB-10 is the batch provided as set forth in Table XVIII.

Results

The compounded stocks prepared above were then sheeted out and cut for cure. The samples were cured for the times and at the temperatures indicated in Table XX and their physical properties evaluated. The results are summarized in Table XX below. Examples 8-12 illustrate rubber compositions within the scope of this invention. Comparative Example R illustrates a rubber composition outside the scope of this invention.

TABLE XX

CURED PHYSICAL PROPERTIES

| Comp. Ex./Ex. | R | 8 | 9 | 10 | 11 | 12 |
|---|---|---|---|---|---|---|
| Cured Characteristics obtained at 160° C. | | | | | | |
| ML (lb-in.) | 6.9 | 7.0 | 6.7 | 6.9 | 7.4 | 6.7 |
| MH (lb-in.) | 39.6 | 40.0 | 38.3 | 39.3 | 37.0 | 36.8 |
| Scorch safety $t_s1$ (min) | 3.1 | 3.0 | 3.4 | 3.5 | 4.3 | 4.4 |
| Scorch safety $t_s2$ (min) | 3.7 | 3.7 | 4.2 | 4.3 | 5.6 | 5.0 |
| Cure time $t_{50}$ (min) | 5.7 | 6.0 | 6.4 | 6.5 | 8.2 | 6.8 |
| Cure time $t_{90}$ (min) | 7.5 | 7.0 | 7.3 | 7.4 | 9.4 | 7.6 |
| Cured at 160° C. | | | | | | |
| Cure Time @ 160° C.(min) | 9.0 | 9.0 | 9.0 | 9.0 | 11.0 | 10.0 |
| Tensile Strength (Mpa) | 26.1 | 27.1 | 28.4 | 26.8 | 25.1 | 24.7 |
| Elongation, % at Break | 512.0 | 591.0 | 598.0 | 587.0 | 625.0 | 616.0 |
| 100% Modulus (Mpa) | 2.8 | 2.3 | 2.2 | 2.1 | 1.9 | 1.7 |
| 200% Modulus (Mpa) | 8.0 | 6.3 | 5.8 | 5.7 | 4.7 | 4.3 |
| 300% Modulus (Mpa) | 14.2 | 11.3 | 10.5 | 10.7 | 8.6 | 8.2 |
| 400% Modulus (Mpa) | 20.3 | 16.7 | 15.8 | 16.2 | 13.2 | 12.9 |
| 500% Modulus (Mpa) | 25.7 | 22.4 | 21.5 | 22.1 | 18.6 | 18.4 |
| Hardness, Shore A. | 65.0 | 62.0 | 64.0 | 60.0 | 63.0 | 57.0 |
| Mooney Viscosity($ML_{1+4}$ at 100° C.) | | | | | | |
| $ML_{1+4}$ | 59.0 | 62.0 | 61.0 | 62.0 | 65.0 | 63.0 |

TABLE XX-continued

CURED PHYSICAL PROPERTIES

| Comp. Ex./Ex. | R | 8 | 9 | 10 | 11 | 12 |
|---|---|---|---|---|---|---|
| Mooney Scorch (MS at 135° C.) | | | | | | |
| 3 Pt. Rise Time (min) | 16.2 | 17.0 | 20.1 | 20.6 | 29.5 | 25.5 |
| 18 Pt. Rise Time (min) | 19.3 | 23.0 | 25.5 | 25.0 | 34.7 | 29.1 |
| Aged 2 weeks at 70° C. | | | | | | |
| Tensile Strength (Mpa) | 25.1 | 27.0 | ~26.2 | 26.4 | 24.7 | 25.6 |
| Elongation, % at Break | 402.0 | 456.0 | 455.0 | 450.0 | 472.0 | 492.0 |
| 100% Modulus (Mpa) | 4.7 | 4.2 | 4.2 | 4.0 | 3.8 | 3.2 |
| 200% Modulus (Mpa) | 12.2 | 11.2 | 10.8 | 10.7 | 8.9 | 8.8 |
| 300% Modulus (Mpa) | 19.5 | 18.3 | 17.7 | 17.8 | 15.1 | 15.3 |
| 400% Modulus (Mpa) | 24.5 | 24.3 | 23.6 | 23.9 | 21.0 | 20.8 |
| Hardness, Shore A. | 72.0 | 69.0 | 71.0 | 67.0 | 70.0 | 64.0 |
| Tangent Delta 60° C. (10 Hz) [RPA-2000] | | | | | | |
| % Strain | | | | | | |
| 0.7 | 0.103 | 0.059 | 0.062 | 0.062 | 0.060 | 0.061 |
| 1.0 | 0.130 | 0.060 | 0.067 | 0.069 | 0.073 | 0.069 |
| 2.0 | 0.182 | 0.082 | 0.089 | 0.084 | 0.092 | 0.086 |
| 5.0 | 0.203 | 0.090 | 0.098 | 0.098 | 0.108 | 0.098 |
| 7.0 | 0.200 | 0.093 | 0.099 | 0.099 | 0.109 | 0.099 |
| 14.0 | 0.186 | 0.103 | 0.109 | 0.110 | 0.118 | 0.103 |
| Dynamic Modulus (G', kPa) | | | | | | |
| % Strain | | | | | | |
| 0.7 | 4965.2 | 3129.1 | 3083.2 | 3228.5 | 3289.7 | 2371.7 |
| 1.0 | 4486.5 | 2989.2 | 2950.9 | 3076.6 | 3147.6 | 2295.2 |
| 2.0 | 3281.5 | 2595.7 | 2587.5 | 2721.4 | 2726.9 | 2043.8 |
| 5.0 | 2343.0 | 2191.0 | 2127.3 | 2188.9 | 2162.3 | 1721.4 |
| 7.0 | 2074.8 | 2024.3 | 1958.5 | 2006.7 | 1959.9 | 1607.4 |
| 14.0 | 1662.8 | 1664.4 | 1592.8 | 1609.7 | 1558.0 | 1385.1 |
| Monsanto Flex to Fatigue | | | | | | |
| Kilocycle to failure | | | | | | |
| 1 | 140.4 | 116.2 | 156.8 | 205.5 | 170.4 | 124.1 |
| 2 | 150.6 | 178.5 | 169.8 | 217.4 | 191.8 | 180.8 |
| 3 | 162.2 | 195.5 | 195.5 | 223.1 | 220.0 | 186.0 |
| 4 | 167.7 | 2332.0 | 233.2 | 228.4 | 220.6 | 200.0 |
| 5 | 173.7 | 245.7 | 245.7 | 246.4 | 234.6 | 205.1 |
| 6 | 199.6 | 282.5 | 282.5 | 248.3 | 260.9 | 208.4 |
| Average of six | 165.7 | 208.6 | 210.2 | 228.2 | 216.4 | 184.1 |
| Average of four | 163.6 | 213.2 | 210.8 | 228.8 | 216.8 | 193.0 |
| Unaged | | | | | | |
| Din Abrasion Index | | | | | | |
| 1 | 109.8 | 104.4 | 97.5 | 98.5 | 71.5 | 68.7 |
| 2 | 103.0 | 104.1 | 101.7 | 93.4 | 80.4 | 62.0 |
| 3 | 104.5 | 97.3 | 103.0 | 89.6 | 80.6 | 68.6 |
| Average | 105.8 | 101.9 | 100.7 | 93.8 | 77.5 | 66.5 |
| Aged 2 weeks at 70 C. | | | | | | |
| Din Abrasion Index | | | | | | |
| 1 | 99.7 | 89.8 | 88.3 | 83.3 | 85.6 | 83.3 |
| 2 | 100.8 | 90.7 | 90.4 | 90.4 | 84.8 | 85.4 |
| 3 | 97.6 | 93.1 | 92.0 | 92.0 | 85.2 | 81.3 |
| Average | 99.4 | 91.2 | 90.2 | 90.2 | 85.2 | 83.4 |

It can be seen from the above data that the rubber compositions of Examples 8-12 containing a high molecular weight thiuram disulfide, a polyalkylene oxide and a nitrogen-containing compound provide equivalent to improved performance compared to the rubber composition of Comparative Example R containing carbon black. The tangent delta values of the rubber compositions of Examples 8-12 were significantly lower than the rubber composition of Comparative Example R.

Additionally, the abrasion indexes of the rubber compositions of Examples 8-10 were slightly lower and Examples 11-12 were significantly lower as compared to the rubber composition of Comparative Example R. The cure rates of the rubber compositions of Examples 8-12 were significantly faster compared to the rubber composition of Comparative Example R.

Thus, by adding a nitrogen-containing compound with a tetraalkyl ($C_{12}$-$C_{14}$) thiuram disulfide, the rolling resistance of the rubber composition has been significantly improved without any sacrifice in physical properties resulting in an economical cost advantage being realized.

COMPARATIVE EXAMPLES S-T AND EXAMPLES 13-16

Employing the ingredients indicated in Tables XXI, XXII and XXIII (which are listed in parts per hundred of rubber by weight), several rubber compositions were compounded using the same general procedure outlined in Examples 1 and 2.

TABLE XXI

PHASE I

| Comp. Ex./Ex. | S | 13 | 14 | 15 | 16 | T |
|---|---|---|---|---|---|---|
| SIR-20 | 100.00 | 100.00 | 100.00 | 100.00 | 100.00 | 100.00 |
| N-220 BLACK | 59.00 | 5.00 | 5.00 | 5.00 | 5.00 | 5.00 |
| ZEOSIL 1165 | 0.00 | 60.00 | 60.00 | 60.00 | 60.00 | 60.00 |
| SUNDEX 790 | 7.00 | 7.00 | 7.00 | 7.00 | 7.00 | 7.00 |
| SILQUEST A-1289 | 0.00 | 6.00 | 4.80 | 3.60 | 2.40 | 4.80 |
| KETTLITZ ACTIVIN | 0.00 | 2.50 | 2.50 | 2.50 | 2.50 | 0.00 |
| MB-11: TOTAL | 166.00 | 180.50 | 179.30 | 178.10 | 176.90 | 176.80 |

TABLE XXII

PHASE II

| Comp. Ex./Ex. | S | 13 | 14 | 15 | 16 | T |
|---|---|---|---|---|---|---|
| MB-11[30] | 166.00 | 180.50 | 179.30 | 178.10 | 176.90 | 176.80 |
| KADOX 911 C | 3.00 | 3.00 | 3.00 | 3.00 | 3.00 | 3.00 |
| FLEXZONE 7P | 2.00 | 2.00 | 2.00 | 2.00 | 2.00 | 2.00 |
| STEARIC ACID | 2.00 | 2.00 | 2.00 | 2.00 | 2.00 | 2.00 |
| SUNPROOF IMP. WAX | 1.50 | 1.50 | 1.50 | 1.50 | 1.50 | 1.50 |
| MB-12: TOTAL | 174.50 | 189.00 | 187.80 | 186.60 | 185.40 | 185.30 |

[30]MB-11 is the batch provided as set forth in Table XXI.

TABLE XXIII

PHASE III

| Comp. Ex./Ex. | S | 13 | 14 | 15 | 16 | T |
|---|---|---|---|---|---|---|
| MB-12[31] | 174.50 | 189.00 | 187.80 | 186.60 | 185.40 | 185.30 |
| DELAC NS | 1.00 | 1.00 | 1.00 | 1.00 | 1.00 | 1.00 |
| ROYALAC150 | 0.00 | 0.40 | 0.40 | 0.40 | 0.4 | 0.00 |
| PVI[32] | 0.20 | 0.20 | 0.20 | 0.20 | 0.20 | 0.20 |
| DPG | 0.00 | 0.00 | 0.00 | 0.00 | 0.00 | 1.00 |
| SULFUR 21-10 | 2.00 | 2.00 | 2.00 | 2.25 | 2.40 | 2.00 |
| TOTAL | 177.70 | 192.60 | 191.40 | 190.45 | 189.00 | 189.50 |

[31]MB-12 is the batch provided as set forth in Table XXII.
[32](Santogard PVI) produced by Flexsys.

Results

The compounded stocks prepared above were then sheeted out and cut for cure. The samples were cured for the times and at the temperatures indicated in Table XXIV and their physical properties evaluated. The results are summarized in Table XXIV below. Examples 13-16 illustrate rubber compositions within the scope of this invention. Comparative Examples S and T illustrate rubber compositions outside the scope of this invention.

TABLE XXIV

CURED PHYSICAL PROPERTIES

| Comp. Ex./Ex. | S | 13 | 14 | 15 | 16 | T |
|---|---|---|---|---|---|---|
| Cured Characteristics obtained at 160° C. | | | | | | |
| ML (lb-in.) | 6.18 | 5.99 | 6.46 | 6.54 | 7.68 | 6.82 |
| MH (lb-in.) | 38.62 | 38.11 | 37.41 | 36.78 | 38.85 | 36.24 |
| Scorch safety $t_s1$ (min) | 2.88 | 2.58 | 2.72 | 2.92 | 2.44 | 2.47 |
| Scorch safety $t_s2$ (min) | 3.54 | 3.26 | 3.49 | 3.75 | 3.71 | 3.18 |
| Cure time $t_{50}$ (min) | 5.50 | 5.32 | 5.72 | 6.01 | 6.27 | 5.42 |
| Cure time $t_{90}$ (min) | 7.21 | 6.29 | 6.70 | 6.98 | 7.32 | 7.28 |
| Cured at 160° C. | | | | | | |
| Cure Time @ 160° C.(min) | 9.00 | 8.00 | 9.00 | 9.00 | 9.00 | 9.00 |
| Tensile Strength (Mpa) | 28.80 | 29.00 | 28.51 | 28.87 | 28.15 | 27.97 |
| Elongation, % at Break | 566.00 | 588.00 | 586.00 | 623.00 | 647.00 | 620.00 |
| 100% Modulus (Mpa) | 2.65 | 2.71 | 2.23 | 2.24 | 2.09 | 2.14 |
| 200% Modulus (Mpa) | 7.63 | 7.22 | 6.29 | 6.16 | 5.39 | 5.46 |
| 300% Modulus (Mpa) | 13.78 | 12.66 | 11.81 | 10.92 | 9.82 | 10.02 |
| 400% Modulus (Mpa) | 19.91 | 18.50 | 17.81 | 16.28 | 14.91 | 15.39 |
| 500% Modulus (Mpa) | 25.50 | 24.34 | 23.89 | 22.08 | 20.53 | 21.34 |
| Hardness, Shore A. | 64.00 | 63.00 | 61.00 | 62.00 | 59.00 | 62.00 |
| Mooney Viscosity($ML_{1+4}$ at 100° C. | | | | | | |
| $ML_{1+4}$ | 56.00 | 58.00 | 62.00 | 61.00 | 64.50 | 59.00 |

TABLE XXIV-continued

CURED PHYSICAL PROPERTIES

| Comp. Ex./Ex. | S | 13 | 14 | 15 | 16 | T |
|---|---|---|---|---|---|---|
| Mooney Scorch (MS at 135° C.) | | | | | | |
| 3 Pt. Rise Time (min) | 17.06 | 11.80 | 14.17 | 17.55 | 22.35 | 14.95 |
| 18 Pt. Rise Time (min) | 21.11 | 19.67 | 22.08 | 25.25 | 27.45 | 21.14 |
| Tangent Delta 60° C. (10 Hz) [RPA-2000] % Strain | | | | | | |
| 0.7 | 0.116 | 0.054 | 0.059 | 0.058 | 0.067 | 0.064 |
| 1.0 | 0.129 | 0.062 | 0.067 | 0.069 | 0.076 | 0.068 |
| 2.0 | 0.172 | 0.068 | 0.073 | 0.076 | 0.095 | 0.079 |
| 5.0 | 0.190 | 0.080 | 0.093 | 0.095 | 0.108 | 0.103 |
| 7.0 | 0.193 | 0.082 | 0.094 | 0.099 | 0.113 | 0.106 |
| 14.0 | 0.179 | 0.086 | 0.097 | 0.103 | 0.122 | 0.113 |
| Tangent Delta 60° C. (10 Hz) [MTS] | | | | | | |
| 1.0 | 0.144 | 0.099 | 0.079 | 0.068 | 0.095 | 0.092 |
| 2.0 | 0.169 | 0.101 | 0.085 | 0.085 | 0.101 | 0.123 |
| 3.0 | 0.182 | 0.108 | 0.087 | 0.089 | 0.102 | 0.125 |
| 4.0 | 0.180 | 0.103 | 0.093 | 0.093 | 0.113 | 0.124 |
| 5.0 | 0.178 | 0.105 | 0.092 | 0.093 | 0.113 | 0.125 |
| 6.0 | 0.174 | 0.108 | 0.091 | 0.094 | 0.112 | 0.125 |
| 8.0 | 0.158 | 0.105 | 0.093 | 0.091 | 0.114 | 0.122 |
| 10.0 | 0.154 | 0.101 | 0.092 | 0.086 | 0.113 | 0.121 |
| Dynamic Modulus (G', kPa) % Strain | | | | | | |
| 0.7 | 4277.0 | 2571.0 | 2724.0 | 2655.0 | 3313.0 | 3244.0 |
| 1.0 | 3891.0 | 2465.0 | 2612.0 | 2541.0 | 3164.0 | 3071.0 |
| 2.0 | 2984.0 | 2246.0 | 2355.0 | 2298.0 | 2768.0 | 2719.0 |
| 5.0 | 2172.0 | 1975.0 | 2016.0 | 1957.0 | 2279.0 | 2230.0 |
| 7.0 | 1935.0 | 1856.0 | 1883.0 | 1826.0 | 2081.0 | 2052.0 |
| 14.0 | 1579.0 | 1626.0 | 1607.0 | 1550.0 | 1669.0 | 1671.0 |
| Unaged Din Abrasion Index | | | | | | |
| 1 | 99.0 | 103.8 | 106.8 | 94.5 | 82.3 | 80.3 |
| 2 | 92.3 | 98.8 | 91.4 | 85.5 | 93.1 | 30.2 |
| 3 | 95.2 | 100.0 | 79.2 | 91.2 | 88.5 | 81.8 |
| Average | 95.5 | 101.0 | 92.5 | 90.4 | 88.0 | 80.8 |

It can be seen from the above data that the rubber compositions of Examples 13-16 containing a high molecular weight thiuram disulfide, nitrogen-containing compound and a polyalkylene oxide provide equivalent to improved performance when compared to the rubber compositions of Comparative Example S containing carbon black and Comparative Example T containing diphenylguanidine. The tangent delta values of the rubber compositions of Examples 14-16 were significantly lower than the rubber compositions of Comparative Examples S and T. Additionally, the cure rates of the rubber compositions of Examples 15 and 16 were significantly faster as compared to the rubber compositions of Comparative Examples S and T.

Furthermore, the Modulus, tensile strength, abrasion index and hardness for the rubber compositions of Examples 13-16 were comparable to the rubber compositions of Examples S and T. Thus, by forming a rubber composition containing a nitrogen-containing compound and tetraalkyl ($C_{12}$-$C_{14}$) thiuram disulfide, the rolling resistance of the rubber composition has been significantly improved without any sacrifice in physical properties resulting in an economical cost advantage being realized.

Although the invention has been described in its preferred form with a certain degree of particularity, obviously many changes and variations are possible therein and will be apparent to those skilled in the art after reading the foregoing description. It is therefore to be understood that the present invention may be presented otherwise than as specifically described herein without departing from the spirit and scope thereof.

What is claimed is:

1. A rubber composition comprising
   (a) a rubber component;
   (b) from about 5 to about 150 phr of a silica filler;
   (c) from about 0.5 to about 15 phr of a coupling agent;
   (d) a combination comprising
      (i) from about 0.2 to about 10 phr of a polyalkylene oxide,
      (ii) from about 0.1 to about 5 phr of an aromatic or cycloaliphatic carboxylic acid of about 6 to about 24 carbon atoms, and
      (iii) from about 0.05 to about 2.0 phr of a nitrogen-containing compound selected from the group consisting of
   carboxylic acid amides,
   hydrocarbyl monoamines,
   hydrocarbyl polyamines wherein the hydrocarbyl group is selected from the group consisting of $C_1$-$C_{50}$ alkyl groups and olefinic groups containing one or two sites of unsaturation and from about 6 to about 200 carbon atoms,
   hydroxy substituted hydrocarbyl monoamines,
   Mannich bases,
   phosphonoamides, thiophosphonoamides,
phosphoroamides,
and mixtures thereof; and (e) from about 0.1 to about 1.0 phr of a thiuram disulfide having a molecular weight of from about 500 to about 1250 and wherein the thiuram disulfide is of the general formula

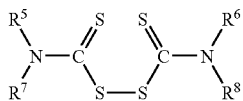

wherein $R^5$, $R^6$, $R^7$ and $R^8$ each are the same or different and are hydrocarbons containing from about 8 to about 18 carbon atoms.

2. The rubber composition of claim 1 wherein the rubber component is selected from the group consisting of natural rubber, homopolymers of conjugated diolefin, copolymers of conjugated diolefins and ethylenically unsaturated monomers and mixtures thereof.

3. The rubber composition of claim 1 wherein the rubber component is selected from the group consisting of poly (styrene-butadiene), styrene-isoprene copolymers, isoprene-butadiene copolymers, styrene-isoprene-butadiene tripolymers, polychloroprene, chloro-isobutene-isoprene, nitrile-chloroprene, styrene-chloroprene, poly (acrylonitrile-butadiene) and ethylene-propylene-diene terpolymer.

4. The rubber composition of claim 1 wherein the silica filler is selected from the group consisting of silica, precipitated silica, amorphous silica, vitreous silica, fumed silica, fused silica, synthetic silicate, alkaline earth metal silicate, highly dispersed silicate and mixtures thereof.

5. The rubber composition of claim 1 wherein the coupling agent is a sulfur-containing coupling agent.

6. The rubber composition of claim 5 wherein the sulfur-containing coupling agent is of the general formula:

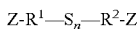
Z-$R^1$—$S_n$—$R^2$-Z in which Z is selected from the group consisting of

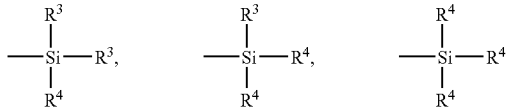

wherein $R^3$ is an alkyl group of from 1 to 4 carbon atoms, cyclohexyl or phenyl; and $R^4$ is an alkoxy of from 1 to 8 carbon atoms, or cycloalkoxy of 5 to 8 carbon atoms; and $R^1$ and $R^2$ are independently a divalent hydrocarbon of from 1 to 18 carbon atoms and n is an integer of from about 2 to about 8.

7. The rubber composition of claim 1 wherein the hydrocarbyl monoamine is an alkylamine or a dialkylamine.

8. The rubber composition of claim 1 wherein the polyalkylene oxide is selected from the group consisting of dimethylene glycol, diethylene glycol, dipropylene glycol, trimethylene glycol, triethylene glycol, tripropylene glycol, polyethylene oxide, polypropylene oxide, polybutylene oxide and mixtures thereof.

9. The rubber composition of claim 1 wherein $R^5$, $R^6$, $R^7$ and $R^8$ are independently selected from the group consisting of hydrocarbons comprising from 12 to 14 carbon atoms.

10. The rubber composition of claim 7 wherein the hydrocarbyl monoamine is selected from the group consisting of isopropyl amine and dibutyl amine.

11. The rubber composition of claim 8 wherein the nitrogen-containing compound is selected form the group consisting of isopropyl amine and dibutyl amine.

12. A rubber composition comprising:
(a) a rubber component;
(b) from about 5 to about 150 phr of a silica filler selected from the group consisting of silica, precipitated silica, amorphous silica, vitreous silica, fumed silica, fused silica, synthetic silicate, alkaline earth metal silicate, highly dispersed silicate and mixtures thereof;
(c) from about 0.5 to about 15 phr of a coupling agent of the general formula:

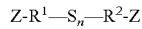
Z-$R^1$—$S_n$—$R^2$-Z in which Z is selected from the group consisting of

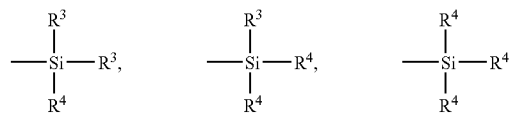

wherein $R^3$ is an alkyl group of from 1 to 4 carbon atoms, cyclohexyl or phenyl; and $R^4$ is an alkoxy of from 1 to 8 carbon atoms, or cycloalkoxy of 5 to 8 carbon atoms; and $R^1$ and $R^2$ are independently a divalent hydrocarbon of from 1 to 18 carbon atoms and n is an integer of from about 2 to about 8;

(d) from about 0.05 to about 2.0 phr of a nitrogen-containing compound selected from the group consisting of alkylamines, dialkylamines, and mixtures thereof;

(e) from about 0.1 to about 1.0 phr of a thiuram disulfide having a molecular weight of from about 500 to about 1250 and wherein the thiuram disulfide is of the general formula

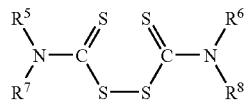

wherein $R^5$, $R^6$, $R^7$ and $R^8$ are independently selected from the group consisting of hydrocarbons comprising from 12 to 14 carbon atoms (f) from about 0.2 to about 10 phr of a polyalkylene oxide selected from the group consisting of dimethylene glycol, diethylene glycol, dipropylene glycol, trimethylene glycol, triethylene glycol, tripropylene glycol, polyethylene oxide, polypropylene oxide, polybutylene oxide and mixtures thereof; and (g) from 0.1 to 5 phr of an organic acid selected from the group consisting of aliphatic carboxylic acids of 2 to about 20 carbon atoms, and aromatic and cycloaliphatic carboxylic acids of 6 to about 24 carbon atoms, per molecule.

13. The rubber composition of claim 12 wherein the silica filler is present in a concentration of from about 15 to about 90 phr, teh sulfur-containing coupling agent is present in a concentration of about 1.0 to about 10 phr, the nitrogen-containing compound is present in a concentration of from about 0.15 to about 1.0 phr, the thiuram disulfide is present in a concentration of from about 0.20 to about 0.70 phr, the polyalkylene oxide is present in a concentration of from about 0.5 to about 5 phr, and the organic acid is present in a concentration of from about 0.2 to about 3 phr.

14. the rubber composition of claim 13 wherein the nitrogen-containing compound is selected from the group consisting of isopropyl amine and dibutyl amine.

15. A rubber composition comprising
(a) a rubber component;
(b) from about 5 to about 150 phr of a silica filler;
(c) from about 0.5 to about 15 phr of a coupling agent;
(d) a combination comprising
 (i) from about 0.2 to about 10 phr of polyethylene glycol,
 (ii) from about 0.1 to about 5 phr of benzoic acid, and
 (iii) from about 0.05 to about 2.0 phr of dibutyl amine, and
(e) from about 0.1 to about 1.0 phr of a thiuram disulfide having a molecular weight of from about 500 to about 1250 and wherein the thiuram disulfide is of the general formula

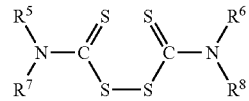

wherein $R^5$, $R^6$, $R^7$ and $R^8$ each are the same or different and are hydrocarbons containing from about 8 to about 18 carbon atoms.

* * * * *